US012781915B2

(12) United States Patent
Valintine

(10) Patent No.: US 12,781,915 B2
(45) Date of Patent: Nov. 3, 2026

(54) LIFTING APPARATUS

(71) Applicant: Basecampvan Ltd, Hartley Wintney (GB)

(72) Inventor: Stephen Valintine, Hartley Wintney (GB)

(73) Assignee: Basecampvan Ltd, Hartley Wintney (GB)

( * ) Notice: Subject to any disclaimer, the term of this patent is extended or adjusted under 35 U.S.C. 154(b) by 101 days.

(21) Appl. No.: 18/743,974

(22) Filed: Jun. 14, 2024

(65) Prior Publication Data

US 2024/0418314 A1 Dec. 19, 2024

(30) Foreign Application Priority Data

Jun. 15, 2023 (GB) .................................... 2308971

(51) Int. Cl.

| | |
|---|---|
| ***F16M 13/02*** | (2006.01) |
| ***A47C 17/80*** | (2006.01) |
| ***A47C 17/84*** | (2006.01) |
| ***B60P 3/36*** | (2006.01) |
| ***B60P 3/38*** | (2006.01) |

(52) U.S. Cl.

CPC ........... *F16M 13/022* (2013.01); *A47C 17/80* (2013.01); *B60P 3/38* (2013.01); *A47C 17/84* (2013.01); *B60P 3/36* (2013.01); *F16M 13/02* (2013.01); *F16M 2200/028* (2013.01); *F16M 2200/048* (2013.01)

(58) Field of Classification Search

CPC ................. F16M 13/022; F16M 13/02; F16M 2200/048; F16M 2200/028; A47C 17/80; A47C 17/84; A47C 17/64; B60P 3/32; B60P 3/36; B60P 3/38; B60P 3/39

USPC ........................................... 5/10.2, 10.1, 118

See application file for complete search history.

(56) References Cited

U.S. PATENT DOCUMENTS 2,706,565 A * 4/1955 Krasno ................. B60P 1/4421 414/545
3,275,170 A * 9/1966 MacRae et al. ...... B60P 1/4421 187/253
4,007,844 A 2/1977 Perkins
4,408,948 A * 10/1983 Robinson .............. B60P 1/4421 414/545

(Continued)

FOREIGN PATENT DOCUMENTS

CA 2492948 7/2006
GB 2633731 A * 3/2025 ................ B60P 3/39
JP H0939641 2/1997

*Primary Examiner* — Robert G Santos

(74) *Attorney, Agent, or Firm* — Wong Meyer Smith & McConnell

(57) ABSTRACT

A lifting apparatus comprising: a platform extending substantially horizontally between a first end, and a second end; a support frame at the first end of the platform; one or more hinge or bearing arrangements coupling the platform to the support frame, the one or more hinge or bearing arrangements configured to rotate about an axis parallel to the first end of the platform; one or more slide rails extending vertically; one or more runners fixed to the support frame, each of the one or more runners arranged to slide along one of the one or more slide rails; means arranged to urge the support frame upwards along the one or more slide rails; and holding means to hold the platform at an elevation at the first end only.

20 Claims, 17 Drawing Sheets

(56) References Cited

U.S. PATENT DOCUMENTS

| | | | | | |
|---|---|---|---|---|---|
| 4,579,500 | A | | 4/1986 | Robinson | |
| 4,806,062 | A | | 2/1989 | Stier | |
| 4,930,971 | A | * | 6/1990 | Wilson | B60P 1/4421<br>187/244 |
| 7,207,076 | B2 | * | 4/2007 | Gardner | A47C 17/50<br>5/118 |
| 9,616,796 | B2 | * | 4/2017 | Russo | B60P 1/4485 |
| 10,981,487 | B1 | * | 4/2021 | Russo | B60P 1/4435 |
| 2005/0217021 | A1 | * | 10/2005 | Gardner | A47C 19/20<br>5/9.1 |
| 2016/0107559 | A1 | * | 4/2016 | Russo | B60P 1/4421<br>29/464 |
| 2024/0418314 | A1 | * | 12/2024 | Valintine | B66F 11/04 |

* cited by examiner

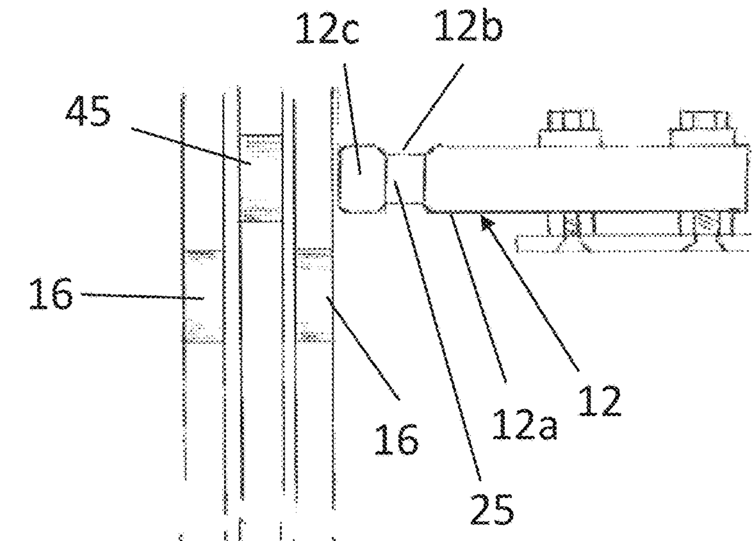
Figure 5A
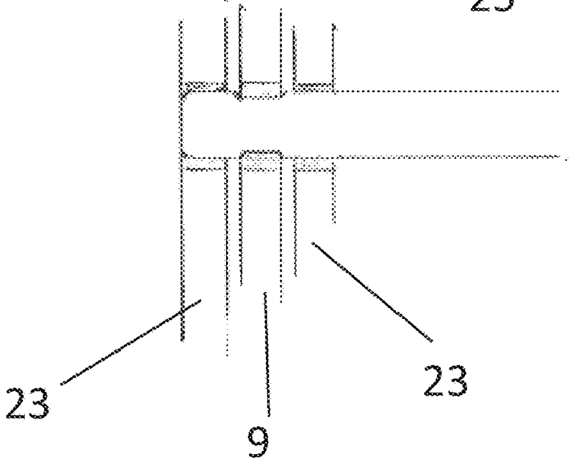
Figure 5B
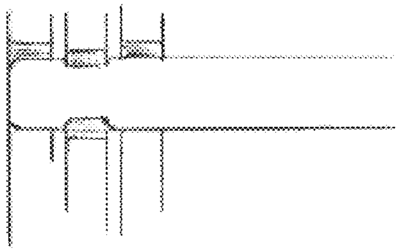
Figure 5C
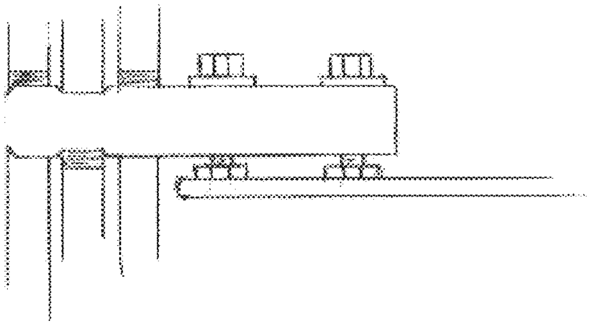
Figure 5D
Figure 5

LIFTING APPARATUS

PRIORITY CLAIM

This application claims the benefit of priority to UK application 2308971.7 filed on 15 Jun. 2023, the entirety of which is incorporated herein by reference.

FIELD OF THE INVENTION

The present disclosure relates to a lifting apparatus arranged to allow manual vertical movement of a weight-bearing platform.

BACKGROUND OF THE INVENTION

There are many situations where it can be useful to move a platform, such as a bed or a workbench, vertically so that the space beneath it can be accessed and used, with the platform or bed moved down again when it is needed. For example, a bed in a campervan or motorhome could be moved out of the way during the day to increase the useable living space and positioned in place at night for a user to sleep in. In another example, a workbench may be provided in a mobile workshop (such as in a van). In this case, a temporary work platform is required without needing or being able to move items from under the footprint of the work platform. Further examples include garages and small workshops, and domestic/residential settings, where beds, desks, workbenches, and the like can be moved out of the way when not needed.

There exist bed or platform lifting systems, but often these are electrically powered, or weight counterbalanced to ensure a user can lift the weight of the platform, and that of any items on it.

There may arise situations where it is desirable for such weight-bearing platforms to be repositioned manually. For example, where power is not easily available or connectable, such as campervans or motorhomes, or remote locations without power, or in situations where it is desirable to use a system less prone to failure and breakdown. In such situations, it is also desirable for the platform and the lifting mechanism to be lightweight and simple.

SUMMARY OF THE INVENTION

According to a first aspect of the invention, there is provided a lifting apparatus comprising a platform extending substantially horizontally between a first end and a second end, and a support frame at the first end of the platform. The apparatus also comprises one or more hinge or bearing arrangements coupling the platform to the support frame, the one or more hinge or bearing arrangements configured to rotate about an axis parallel to the first end of the platform. In addition, the lifting apparatus comprises one or more slide rails extending vertically, one or more runners fixed to the support frame, each of the runners arranged to slide along the slide rails, means arranged to urge the support frame upwards along the one or more slide rails, and holding means to hold the platform at an elevation at the first end only.

The holding means may hold the platform against the action of the means of urging the support frame upwards.

The hinge or bearing arrangement minimises the cantilever force of the platform on the slide rails and the runners.

The holding means holds the platform at an elevation at the first end only, making the platform convenient and easy to use.

The means arranged to urge the support frame upwards may be arranged so that the upwards force on the support frame is substantially equal to or greater than the weight of the platform, or the means arranged to urge the support frame may be arranged such that the force from the means arranged to urge the support frame is less than the weight of the platform, allowing it to slide downwards along the one or more slide rails with a dampened motion.

The platform may thus be substantially weightless when a user slides it along the rails, or even self-raising in the absence of a force holding it in place. The platform may move downwards under its own weight.

Alternatively, the means arranged to urge the support frame upwards may be arranged so that the force from the means arranged to urge the platform is less than the weight of the platform. In this case, the platform may slide downwards along the rails with a dampened motion and a substantially small amount of effort is required to lift the platform.

The lifting apparatus may comprise a suspension arrangement arranged to hold one end of the platform from above. Such suspension arrangement may be arranged to suppress any cantilever effect in a simple, light weight and cost effective manner.

The suspension arrangement may include linking means extending between the second end of the platform and the support frame.

The suspension arrangement may include a guide mechanism to guide the linking means above the platform.

The guide mechanism may comprise one or more cylindrical rollers suspended by its two ends from a fixed anchor, the rollers arranged to rotate around an axis perpendicular to the linking means. Alternatively, the guide mechanism may comprise low friction members. The low friction members may comprise seatbelt sliders. The low friction members may comprise cables and/or pulleys.

The suspension arrangement may comprise two or more linking means.

The linking means may be connected at points spaced along the second end of the platform. The linking means may be elastic.

The linking means may be web strapping. The linking means tautness may be adjustable. The linking means may be fixed to the platform by wrap-around plates with high tensile bolts. The lifting apparatus may comprise a slider mechanism arranged to adjust the tautness of the linking means.

The suspension arrangement may be arranged to exert a downwards force on the support frame and an upwards force on the platform.

The suspension arrangement and the means of urging the support frame may be chosen so that the upwards force from the means of urging the support frame is substantially equal to the weight of the platform such that the platform is substantially weightless.

The suspension arrangement and the means of urging the support frame may be chosen so that the upwards force from the means of urging the support frame is more than the weight of the platform such that no effort is required to lift and the platform is therefore self-raising.

The suspension arrangement and the means of urging the support frame may be chosen so that the upwards force from the means of urging the support frame is less than the weight of the platform such that the platform downwards motion is substantially slow, and a substantially small amount of effort is required to lift it.

The holding means may be actuable from the second end of the platform.

The holding means may be actuable between an engaged position where it holds the platform in place along the vertical extent of the one or more slide rails, and an unengaged position in which the platform is free to slide with respect to the one or more slide rails.

The holding means may comprise a single point initiation of the locking mechanism. This makes the system safe and easy to use.

The holding means may comprise one or more vertical column plates. The holding means may comprise one or more first holes extending through the support frame, and one or more holes extending through each vertical column plate and a retaining member that extends through the one or more first and second holes, holding the support frame, when a first hole is vertically aligned with a second hole, allowing the holding means to move in the engaged position.

The retaining member may comprise a retaining pin arranged to extend through the one or more first and second holes in the engaged configuration.

Alternatively in another embodiment the holding means may comprise one or more vertical column plates with notches on a vertical edge thereof. The notches on the vertical column plates may receive complementary projections on a slide block.

The support frame may comprise an aperture through which a slide block extends such that the slide block is engaged with the support frame.

When the projections on the slide block are received within the notches on the vertical column plates, the notches may prevent vertical movement of the support frame and platform, so that the platform is held in place.

The slide block may be moveable between two positions. In a first, engaged, position, the projections are engaged with the notches on the vertical support plates. In a second, disengaged, position the projections may be horizontally displaced from the notches, allowing the support frame and the platform to move vertically. The slide block may be moved between the first position and second position by sliding through the aperture in the support frame. In the second position, a projection on the slide block may be received in the aperture in the support frame.

The lifting apparatus may comprise a right-angled bracket, to secure the slide block to the support frame. The bracket may comprise an elongated opening through which fixing means are provided to secure the bracket to the slide block. The elongated opening may be arranged to allow the bracket to slide horizontally with respect to the vertical column plate.

The bracket may be affixed to the slide block using any suitable means.

The movement of the slide block or any other retaining means may be provided by a connecting member extending from the first end of the platform to the second end of the platform. The connecting member on the underside of the platform may comprise a forked plate assembly configured such that a single actuator at the second end of the platform can move the slide block.

The forked plate assembly may be unconnected to the slide block.

There may be provided a retention spring arranged to pull back the slide block along the forked plate assembly when the system is in the unengaged position.

In the engaged position, the teeth of the slide block and the notches on the supporting columns provide a supporting engagement with substantially high sheer stress.

Alternatively in another embodiment, the platform may rest on posts to hold the platform at a desired vertical position.

In this embodiment, when the suspension arrangement and the means of urging the support frame is chosen so that the upwards force from the means of urging the support frame is less than the weight of the platform (such that the platform moves downwards under its own weight in a damped motion), the posts may act as a holding means to prevent further downwards motion.

Alternatively, when the suspension arrangement and the means of urging the support frame is chosen so that the upwards force from the means of urging the support frame is greater than the weight of the platform (such that the platform moves upwards under its own weight in a damped motion), retainer latches may be provided to secure the platform to the support posts and hold the platform in place.

The support posts may be of fixed length or adjustable length. The length may be adjustable by adding further lengths or they may be telescopic.

The platform may comprise a backup safety feature in the case of the holding means failing—this may be a permanent fixture on each vertical support plate at a fixed elevation that prevents any downwards movement of the support frame past a limit point. This may be, for example, a pin extending through the support plates on each side of the platform.

The lifting apparatus may comprise two vertical support plates either side of the support frame such that the support frame is in-between two vertical support plates.

The lifting apparatus may be provided such that it comprises a holding means actuator.

The holding means actuator may comprise an index plunger operable between two positions, wherein the index plunger is arranged such that the actuation of the index plunger causes movement of the retaining pin or the slide block, and wherein a single index plunger causes movement of each retaining pins of each vertical column plate.

Where there are two or more vertical column plates, each with a corresponding retaining pin, a single index plunger causes movement of the retaining pins.

The holding means may be actuated by rotation of the index plunger. This may allow the spring force of an index plunger to engage.

In the engaged position, the platform may support weight equal to the shear force of the cylindrical retaining pins or the shear force of the two engaging notches on the slide block embodiment.

Alternatively, the holding means may be operated via manual push.

The index plungers may be operated by pulling the pin out and rotating the head, locking the system in position. The release of the plungers may be achieved by rotating the head, resulting in an internal spring releasing the pin.

The movement of the retaining member may be provided by a connecting member extending form the first end of the platform to the second end of the platform.

The system may be provided such that it can be locked or unlocked from any end of the platform.

The actuation of the index plunger may move the connecting member.

The connection between the index plunger and connecting member may be to facilitate the adjustment of the retaining pins or the slide block relative to the support frame.

The lifting apparatus may comprise at least two slide rails extending parallel to each other. The two slide rails may be spaced along the first end of the platform.

Similarly, the forked plate assembly of the connecting member on the underside of the platform may be configured such that a single actuator at the second end of the platform can move two retaining members.

The lifting apparatus may comprise two runners vertically spaced on each slide rail.

The means to urge the support frame may be a resiliently deformable member. The resiliently deformable member may be a gas spring. The resiliently deformable member may be any suitable hydraulic system. The resiliently deformable member may be any suitable system for urging a member upwards or pulling a member downwards.

The resiliently deformable member may be any suitable means for urging a member at an oblique angle upwards or downwards.

The resiliently deformable member may be a spring with a damper. The resiliently deformable member may be a screw linear actuator.

The spring characteristics of the resiliently deformable member may be fixed. Alternatively, the spring characteristics of the resiliently deformable member may be adjustable at a first set up or during use.

The hinge arrangements may comprise a pivot bolt joining two vertical faced brackets, a first vertical face bracket attached to the platform, and a second vertical face bracket is attached to the support frame. In such an embodiment, the hinge arrangement may be arranged to rotate around a single axis only. A bearing arrangement may be provided with multiple degrees of freedom.

The lifting apparatus may comprise a linear actuator to provide for an automated function.

The lifting apparatus may comprise a linear actuator in addition to the resiliently deformable member to provide for an automated function. The linear actuator can be disengaged easily and quickly by the operator to revert to the manual operation.

The linear actuator may be a hydraulic lift.

The effective downward force of the platform, including the upwards force of the means to urge the platform, may be only 20 N. In this situation, the platform, while substantially heavier, may have an effective mass less than 5 kg. This effective mass may be 2 kg.

According to a second aspect of the invention, there is provided a vehicle having a lifting apparatus as described above, The platform of the lifting apparatus of the vehicle may be a bed.

It will be appreciated that any feature described in relation to a particular aspect may be applied mutatis mutandis to any other aspect, unless mutually exclusive.

BRIEF DESCRIPTION OF THE DRAWINGS

Embodiments of the invention will now be described, by way of example only, with reference to the accompanying drawings, in which:

FIG. 5A illustrates a cross-sectional view of the detail "AA" of FIG. 4, showing the retaining pins retracted;

FIG. 5B shows the retaining pin pushed through holes in support frame and support plates;

FIG. 5C shows the retaining pin pushed through the holes in the support frame and support plates, as weight is first placed on the platform;

FIG. 5D shows the retaining pins pushed through the holes in the support frame and support plates, with a large weight on the platform;

DETAILED DESCRIPTION OF THE INVENTION

Figure 1:
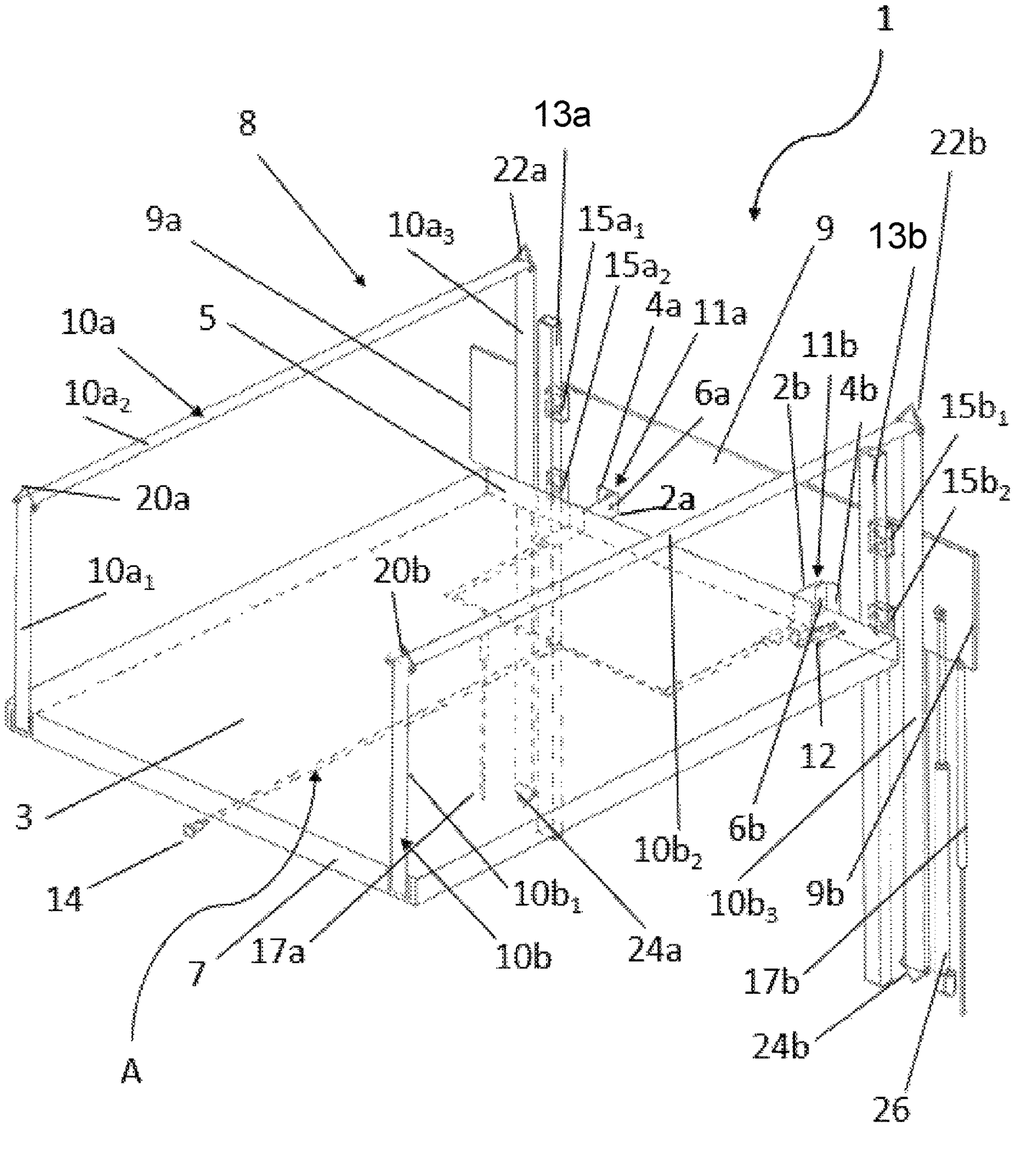
FIG. 1 illustrates a perspective view of an example lifting apparatus.
Figure 2:
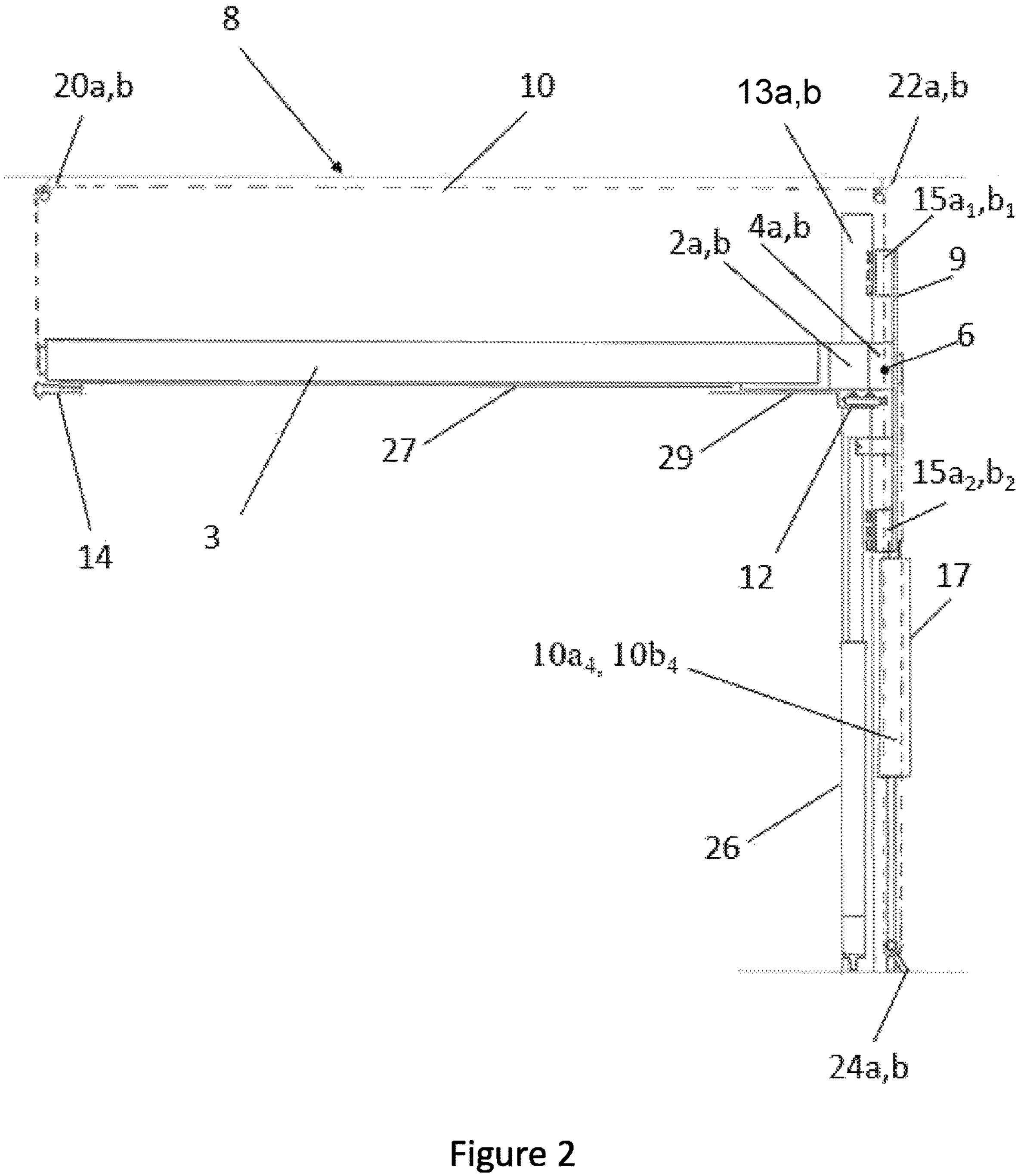
FIG. 2 illustrates a side-view of the lifting apparatus.

FIGS. 1 and 2 schematically illustrate a lifting apparatus 1 according to an embodiment of the invention. The lifting apparatus 1 includes a platform 3 extending substantially horizontally. By action of the lifting apparatus 1, the platform 3 is moved vertically up and down and held at a chosen position.

The platform 3 extends between a first end 5 and a second end 7.

A support frame 9 is provided at the first end 5 of the platform 3. The support frame 9 comprises a substantially rectangular member extending substantially perpendicular with respect to the platform 3, and parallel to the ends 5, 7 of the platform 3. The support frame 9 is disposed at or near the first end 5 of the platform 3 such that the platform 3 abuts the support frame 5.

The support frame 9 is supported by two gas springs 17*a*, 17*b* that urge the support frame 9 upwards.

To guide the vertical motion of the support frame 9, a pair of slide rails 13*a,b* is provided, one at or near each vertical side of the support frame 9. The slide rails 13*a,b*, are profiled to define a linear track that can accommodate bearing runners 15$a_{1-2}$,$b_{1-2}$. The bearing runners 15$a_{1-2}$,$b_{1-2}$ thus slide up and down the slide rails 13*a,b*.

The bearing runners 15$a_{1-2}$,$b_{1-2}$ are rigidly fixed to the support frame 9, providing an arrangement via which the support frame 9 can be moved up and down the slide rails 13*a,b*.

Two bearing runners 15$a_{1-2}$,$b_{1-2}$ are provided for each slide rail 13*a,b*. The bearing runners 15$a_{1-2}$,$b_{1-2}$ on each individual slide rail 13*a,b* are vertically spaced on the support frame 9, such that the four bearing runners 15$a_{1-2}$, $b_{1-2}$ are at the corners of a rectangle. This provides a smooth linear motion if there is a weight imbalance from the end 5 to the end 7 of the platform 3 or from side to side.

The platform 3 is coupled to the frame 9 by a pair of hinge arrangements 11*a*, 11*b*, spaced along the first end 5. Each hinge arrangement 11*a*, 11*b* comprises a pair of vertical faced brackets 2*a*, 2*b*, 4*a*, 4*b*, and a hinge bolt 6*a*, 6*b* extending between the brackets 2*a*, 2*b*, 4*a*, 4*b*.

The first vertical bracket 2*a*, 2*b* of each hinge arrangement 9 is fixed to the first end 5 of the platform 3. The first vertical bracket 2*a*, 2*b* extends away from the first end 5 of the platform 3 towards the frame 9. The second bracket 4*a*, 4*b* is fixed to the support frame 9 and extends away from the support frame 9 towards the platform 3. The hinge bolt 6*a*, 6*b* extends between the first vertical bracket 2*a*, 2*b* and second vertical bracket 4*a*, 4*b* of each hinge arrangement 6*a*, 6*b* in a direction parallel to the first end 5 of the platform 3. Therefore, the platform 3 can pivot vertically around the bolts 6*a*, 6*b*.

This arrangement provides for at least a portion of the weight of the platform 3 to be supported by the support frame 9, with the fulcrum at which the weight of the platform 3 is exercised being the hinge bolts 6*a,b*.

As shown in FIG. 1, a suspension arrangement 8 is also provided to hold the platform 3 from above. The suspension arrangement 8 comprises a pair of linking means 10*a*, 10*b* supporting the platform 3 from its second end 7. In the described embodiment each linking means 10*a*, 10*b* is an elongate line of seat belt webbing, and the two linking means 10*a*, 10*b* extend parallel to each other spaced across at least part of the width of the platform 3.

One end of each line of seat belt webbing 10*a*, 10*b* is fixed to the second end 7 of the platform 3, at positions spaced along the second end 7. The lines of seat belt webbing 10*a*, 10*b* then extend continuously through, in order, a first section 10$a_1$, 10$b_1$, second section 10$a_2$, 10$b_2$, third section 10$a_3$, 10$b_3$ and a fourth section 10$a_4$, 10$b_4$. The start and end of the sections 10$a_{1-4}$, 10$b_{1-4}$ are defined where the seat belt webbing changes direction, which is affected by passing the seat belt webbing 10*a*, 10*b* through sliders 20*a*, 22*a*, 24*a*, 20*b*, 22*b*, and 24*b*.

The first section 10$a_1$, 10$b_1$ of each line of seat belt webbing 10*a*, 10*b* extends substantially vertically, upwards from the platform 3. Each line of seat belt webbing 10*a*, 10*b* then passes through a first slider 20*a*. 20*b* above the platform 3, where it changes to extend in a substantially horizontal direction.

The second section 10$a_2$, 10$b_2$ of each line of seat belt webbing 10*a*, 10*b* extends horizontally between the first slider 20*a*, 20*b* and a second slider 22*a*, 22*b*, at or near the first end 5 of the platform 3. Therefore, the second sections extend substantially parallel to the platform 3, spaced vertically above the platform 3.

The third section 10$a_3$, 10$b_3$ of each line of webbing 10*a*, 10*b* then extends vertically between the second slider 22*a*, 22*b* and a third slider 24*a,b* attached below the platform 3. The third slider 24*a,b* may be attached at the level of the floor 39.

The fourth section 10$a_4$, 10$b_4$ of each line of seat belt webbing 10*a*, 10*b* then passes vertically to the support frame 9. A second end of each line 10*a*, 10*b* is then attached to the support frame 9, spaced along the support frame 9.

The vertical faced bracket 2*a*, 2*b* of the hinge arrangement 9 has a chamfered face which allows the seat belt webbing 10*a*, 10*b* to take weight while allowing the upwards push motion to proceed.

The lifting apparatus 1 may comprise any suitable linking means. This may be seat belt, and/or rubber belts, and/or cables.

The attachment points on the support frame 9 are designed to minimise the load of bearings for all modes of operation.

In one example, the third sliders 24*a,b* are adjustable to adjust the tensioning/tautness of the linking means 10*a*, 10*b*, as will be discussed below in more detail.

The webbing 10 is fixed to the support frame 9 and the platform 3 by wrap-around plates with high tensile bolts (not shown).

The suspension arrangement 8 described above is arranged such that at least a portion of the weight of the platform 3 exerts a downwards force on the support frame 9, through the linking means 10*a*, 10*b*.

As discussed above, the full weight of the platform 3 is transferred to the support frame 9 by the hinge arrangements 11*a*, 11*b* and the suspension arrangement 8. Therefore, the full weight of the platform 3 is supported through the gas springs 17 and acts against the gas springs 17.

A number of brackets (not shown) are provided to secure the lifting apparatus 1 to a support surface or support member, such as a floor or chassis of a vehicle, or a floor of a building, the upper roof of a van or a ceiling joist. This includes brackets to hold the third sliders 24*ab* of the suspension arrangement 8, brackets to secure the slide rails 13, brackets to secure the weight-bearing support columns 23, and brackets anchoring the gas springs 17 to the support surface or member.

Figure 9:
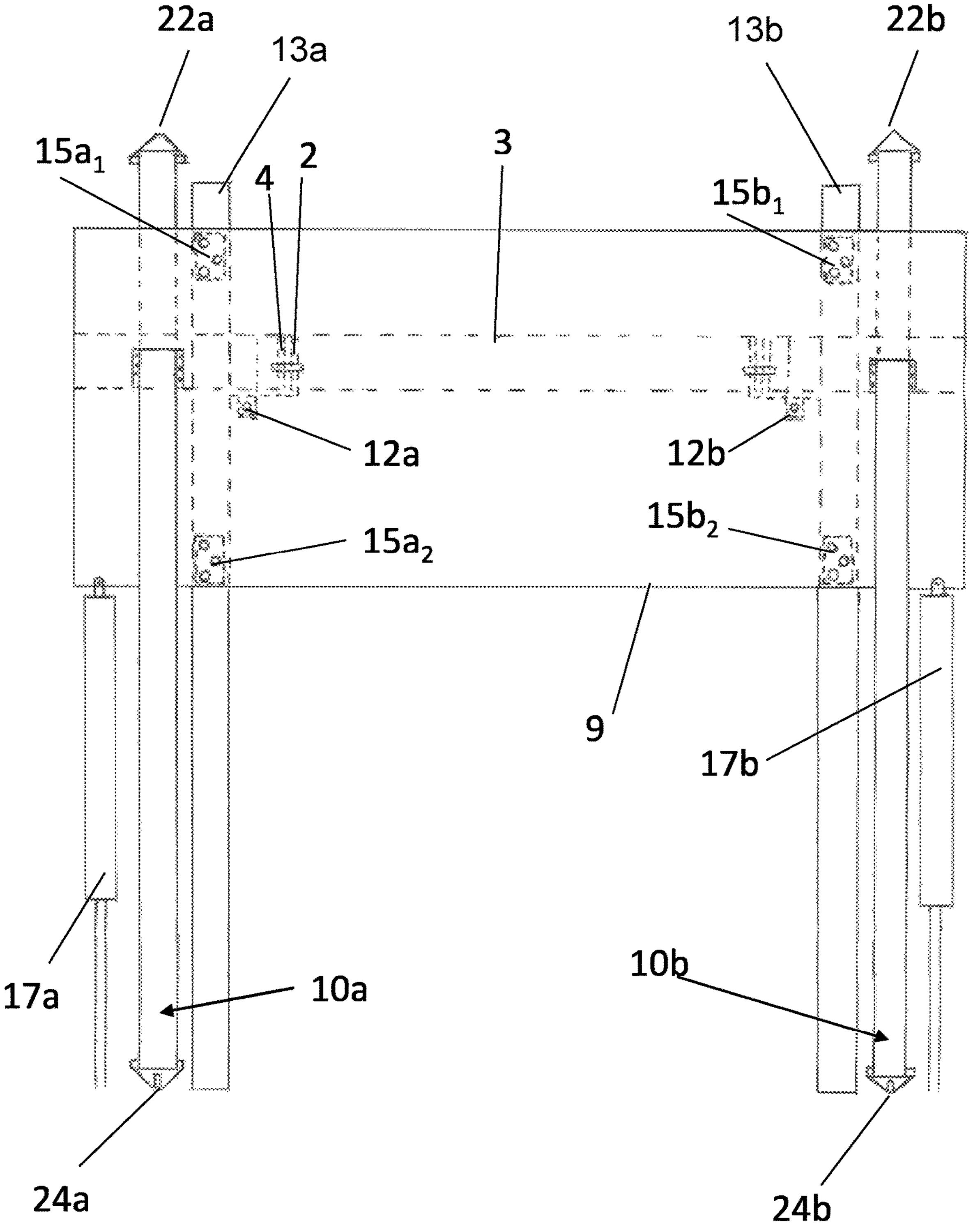
FIG. 9 illustrates a front-view of the lifting apparatus from the first end.

These brackets are sufficiently robust enough to ensure the upwards pull force at the slider 24*a,b* is compensated by the downward push by the resiliently deformable member 17. Given the direction of the resulting forces, only downward forces are exerted on the floor by the lifting apparatus 1. There may also be small additional and negligible stabilising forces on the bearing runners 15$a_{1-2}$,$b_{1-2}$ if the bearing runners 15$a_{1-2}$,$b_{1-2}$ undergo any small stabilisation forces. The lifting apparatus 1 is designed to minimise these forces by a suitable placement of component attachment points. This is achieved by ensuring symmetry between both sides of the apparatus (as illustrated in FIG. 9) and as much symmetry as possible of holding mechanism points/seat belt attachment points relative to the axis of the bearing runners.

Similar brackets are used to secure the sliders 20*a,b*, 22*a,b* of the suspension arrangement 8 from different support surfaces or members, such as ceiling, awning, roof joists, or a roof.

The brackets and sliders above the platform 3 may have a resultant force pointing 45° from the vertical acting upon them.

To secure the platform 3 at a desired height, a holding means 21 is provided. The holding means 21 can be switched between an unlocked configuration in which the platform 3 is moveable, and a locked configuration in which the platform 3 is held in place.

The holding means 21 comprises a pair of vertical weight-bearing column plates 23*a*, 23*b*, 43*a*, 43*b* fixed to each of the slide rails 13*a,b* for rigidity.

The pairs of vertical support column plates 23*a,b*, 43*a,b* are disposed on either side of the support frame 9, parallel to the ends of the platform 3. The two vertical support column plates 23*a,b* 43*a,b* within each pair are spaced from each other in a direction parallel to the length of the platform 3 between the first end 5 and the second end 7 of the platform 3 (perpendicular to the ends of the platform 3). The vertical column plates 23*a,b*, 43*a,b* are rigidly fixed to the slide rails 13*a*, 13*b*, and are offset form the slide rails 13*a*, 13*b* along a direction parallel to the length of the platform 3 between the first end 5 and second end 7 and in a direction perpendicular to the length and the vertical. Therefore, in a plane parallel to the platform 3, the vertical support column plates 23*a,b*, 43*a,b* are diagonally offset from the slide rails and the support frame 9 slides between the pairs of vertical column plates 23*a*, 23*b*, 43*a*, 43*b*.

The vertical column plates 23 comprise a series of holes 16 extending through the vertical column plate 3 and spaced along a vertical axis. These holes are also referred to as locator points. The support frame 9 also has holes 45 at the same horizontal spacing and on the same vertical axis as the vertical support column plates 23*a,b*, 43*a,b*. A single hole is provided in the support frame 9 for each pair of vertical support column plates 23*a,b* 43*a,b*.

The holes 16, 45 in the vertical column plates 23*a*, 23*b* and support frame 9 are sized to accommodate cylindrical retaining pins 12. When the holes 16, 45 in the support frame 9 and the column plates 23*a,b*, 43*a,b* are aligned in a vertical direction, the retaining pins 12 extend through both holes 16, 45 to hold the platform 3 in place. Using different holes in the vertical support column plates 23*a,b*, 34*a,b* allows different heights to be selected.

The holding means is actuated by a user operating an index plunger 14, when the platform has been positioned manually at the desired height.

The index plunger 14 is provided at the second end 7 of the platform, whilst the cylindrical retaining pins 12 are provided at the first end 5 of the platform 3, at the support frame 9. The index plunger 14 is mounted onto the platform 3 via a bracket 18.

A connecting member 27 is provided between the index plunger 14 and the cylindrical retaining pins 12 to translate activation of the index plunger 14 to movement of the cylindrical retaining pins 12. A single index plunger 14 may be connected to multiple retaining pins by means of a connecting member 27 in the form of a forked plate 27, which extends from a single connection at the index plunger 14 to opposing ends, for each retaining pin. This ensures both sides of the platform 3 are locked simultaneously, avoiding, for example, one of the hinges being overloaded.

The connecting member 27 is held in place by one or more screws 38 extending through elongate slots 37 in the connecting member 27, into the platform 3. The slots 37 have a width less than the diameter of the head of the screw, to retain the screw in place, and a length longer than the diameter of the screw to allow sliding of the connecting member relative to the platform. The length of the slots is oriented along the length of the platform 3 from the first end to the second end 7. In one example, the connecting member 27 may include a recess 38 wider than the screw head around the slot 37, such that the screws 38 are countersunk with respect to the lower face of the connecting member 27. Each connecting member 27 may be connected to the platform 3 at one or more positions along its length.

Figure 6:
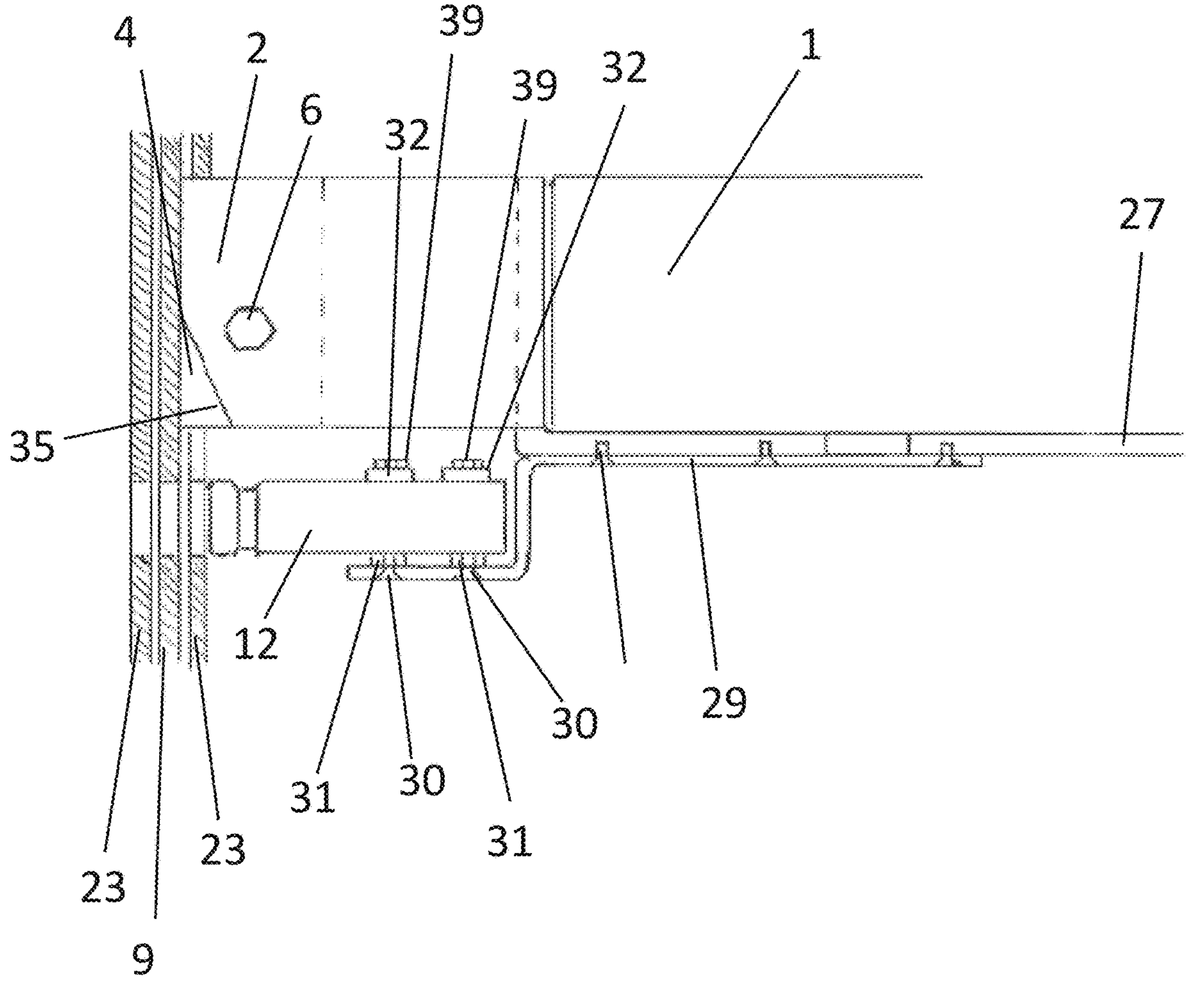
FIG. 6 shows a cross-sectional view of the retaining pin fixed to the platform.
Figure 7:
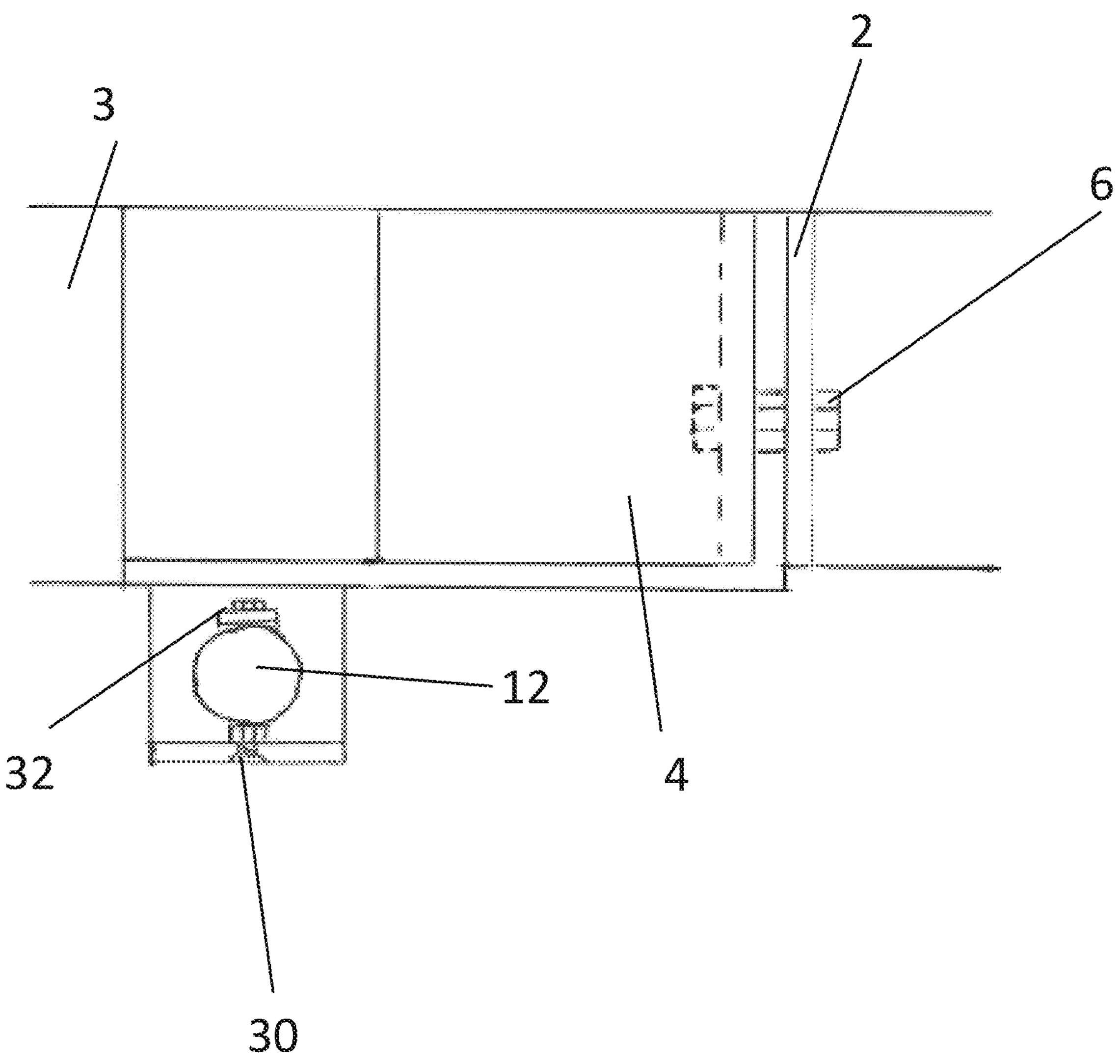
FIG. 7 illustrates an end-view of the assembly shown in FIG. 6.
Figure 8:
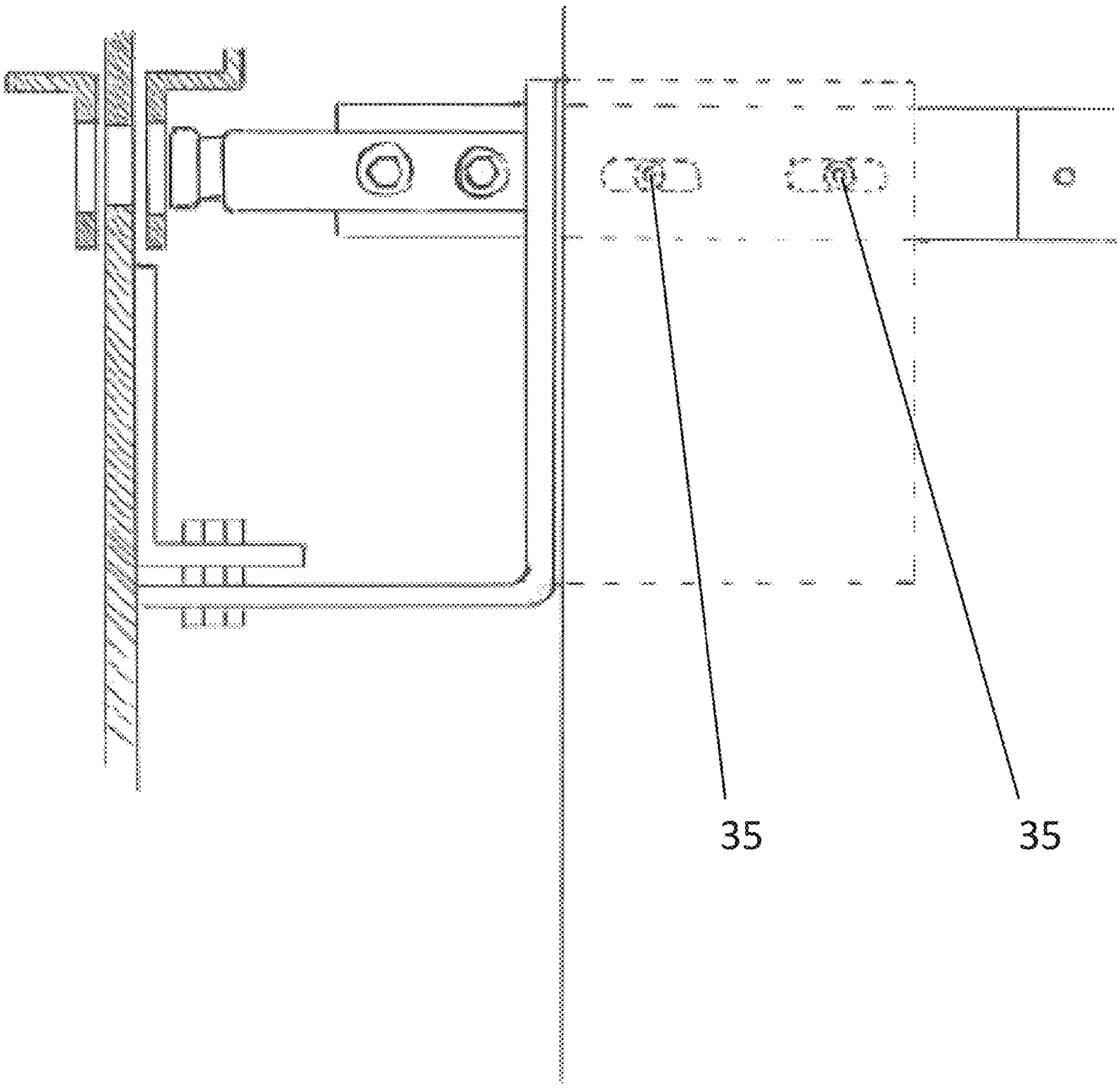
FIG. 8 illustrates a top view of the assembly shown in FIG. 6.

As best shown in FIGS. 6, 7, and 8 a plate 29 is provided on the underside of the platform 3, under the first vertical faced bracket 2. The plate 29, is disposed such that it is slidable to and from the support frame 9 in a direction parallel to the length of the platform 3 between the first end 5 and second end 7. The plate 29 attached to the connecting member 27 with a bolt, such that any motion of the index plunger 14 is translated into a motion of the plate 29.

The retaining pins 12 are attached to the plate 29 via two bolts 30. The bolts 30 are held into position by two nuts 31. Two fine tolerance holes are drilled into the retaining pin 12 which then slides into place over the bolts 30. Two soft rubber washers 32 and two retaining nuts 39 complete the assembly of the retaining pin 12 and the plate 29. The rubber washers are provided between the pins 12 and the retaining bolts 39. This arrangement provides for the allowance of small vertical movements of the retaining pin 12.

Optionally, a section of threaded bar 19 is fixed onto the index plunger 14, between the index plunger 14 and connecting member 27. This facilitates the adjustment of the connecting member and cylindrical retaining pins 12 relative to the support frame 9, in a direction parallel to the length of the platform 3 between the first end 5 and second end 7.

The action of the holding means is controlled by the index plunger 14 only. This means that even if multiple retaining pins are provided to provide secure location, the operation is only from a single point.

Figure 3A:
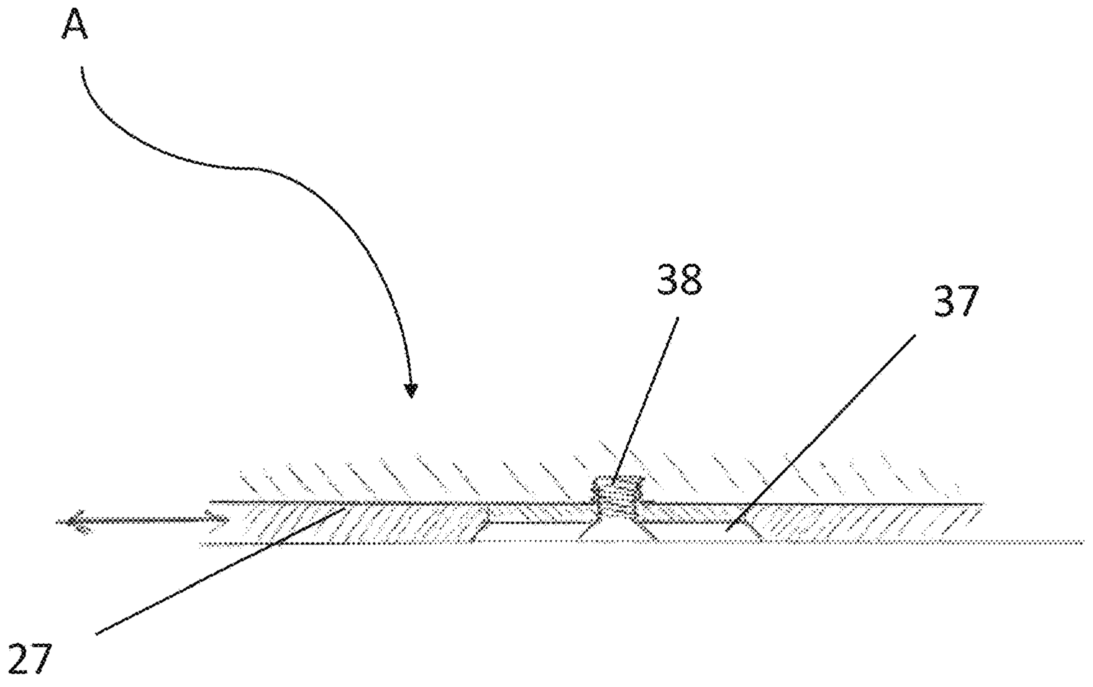
FIG. 3A illustrates a cross sectional view of the connecting member and platform.
Figure 3B:
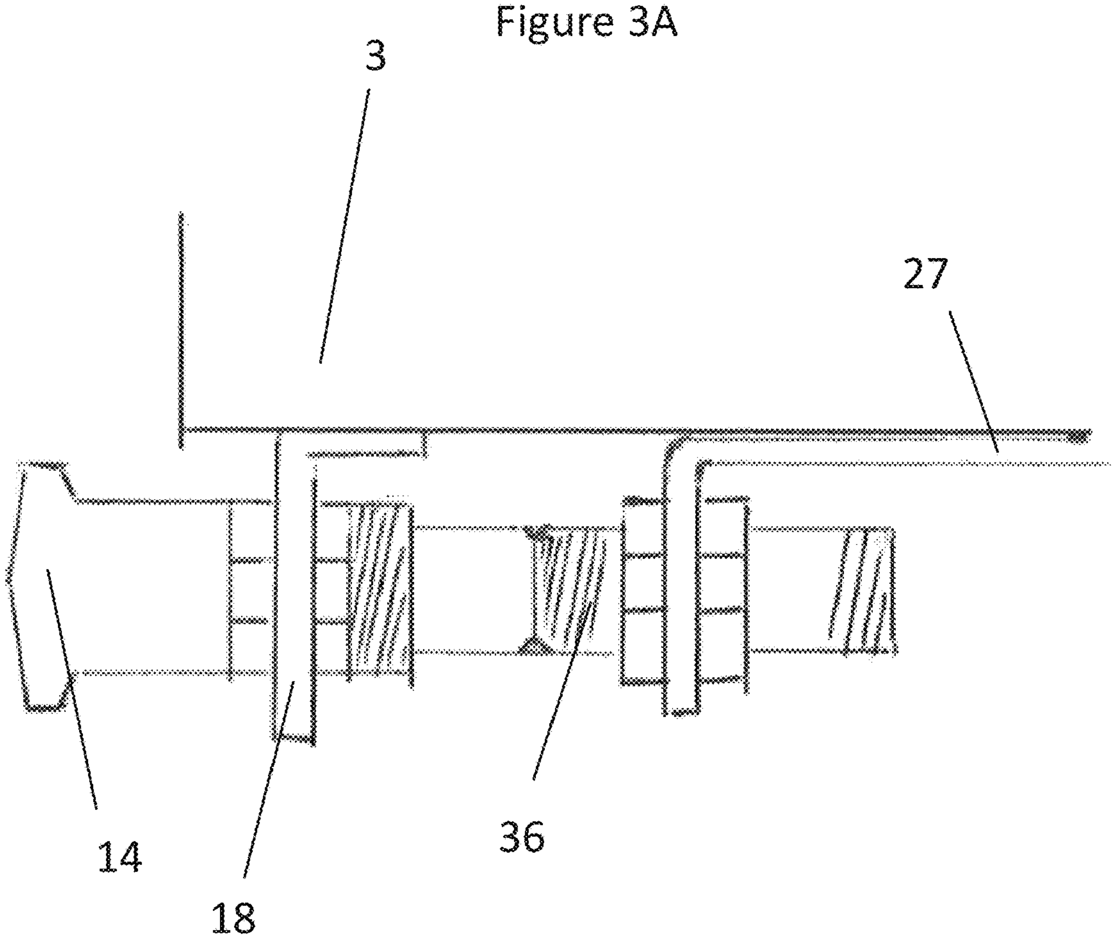
FIG. 3B illustrates a cross-sectional view of the index plunger and forked plate assembly.
Figure 4:
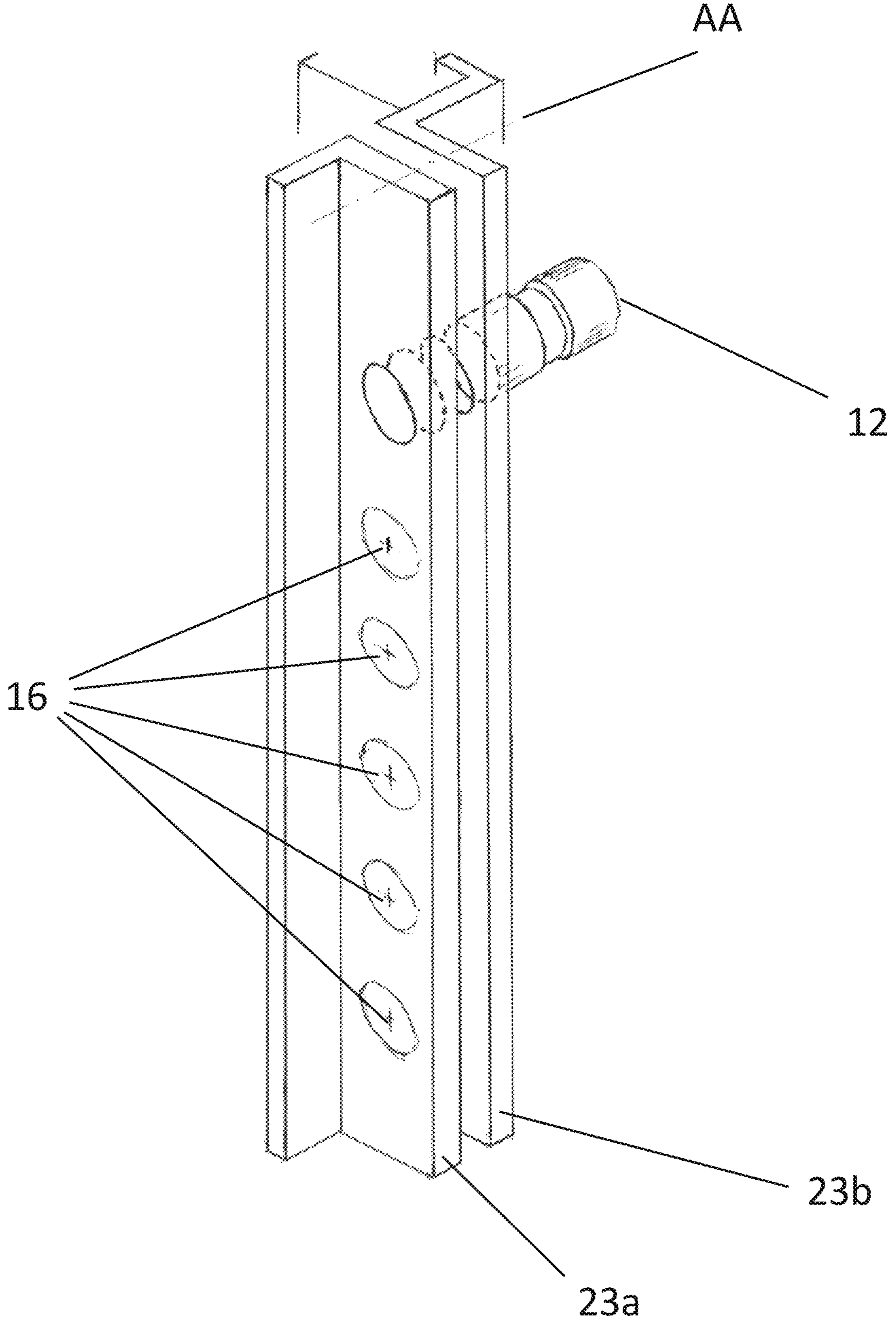
FIG. 4 shows a perspective view of two support plates and the cylindrical plunger at several positions.

FIGS. 3A and 3B shows the action of the index plunger 14 on the connecting member 27 which is moveable backwards and forwards in the axis connecting the second end 7 and the first end 5 of the platform 3.

The retaining pins 12, thus moved by the action of the index plunger 14, can either retract to allow the platform 3 to be moved vertically, or push forward, going through the holes of the support frame 9 and the support columns 23, 43.

FIG. 3B shows the assembly of the index plunger 14 with the forked connecting member 27 to allow a single index plunger to control multiple retaining pins (for example one for each slide rail/pair of vertical support columns plates 23*a,b*, 43*a,b*).

The index plunger 14 can be indexed between the unengaged position, with the cylindrical retaining pins 12 retracted, when the platform 3 can be moved vertically, and the engaged position, with the cylindrical retaining pins 12 extending through the vertical support plates. In the engaged position, the platform 3 can support weight equal to the shear force of the cylindrical retaining pins 12.

The cylindrical retaining pins may be made of any suitable material. The cylindrical retaining pins may be made of materials with suitably high yield strength, and/or ultimate tensile strength, and/or shear strength.

The mechanism via which the action of the index plunger results in the locking of the platform 3 into position will now be described in detail, with reference to FIGS. 1, 3, 4 and 5A-D.

In FIG. 5A, the index plunger 14 is retracted so that the retaining pins 12 are retracted and the platform 3 can be raised vertically or lowered. In FIG. 5B, the holes in the support frame 9 and the support columns 23 are aligned and the index plunger 14 is pushed into the engaged position, pushing the retaining pins 12 through the holes in the support frame 9 and vertical support column plates 23*a,b*, 43*a,b*, such that the platform 3 is held in place.

One example of an index plunger has a plunger, an internal compression spring and a body housing the internal compression spring. The body may be threaded or may be a smooth sleeve. When actuated, the spring pushes the plunger out, and it slides against the body of the support column plates 23*a,b*, 43*a,b*. The index plunger 14 can include a latching mechanism to hold it in place until it is retracted, at which point it unlatches, resulting in the plunger pushing back against or into the body, compressing the internal compression spring.

The pushing of the index plunger 14 into the engaged position occurs under the force of its own internal spring. The cylindrical retaining pin 12 pushes out and slides against the support column plates 23*a,b* and 43*a,b* until it vertically aligns with a hole. The retaining pins 12 then pushes, under the force of the spring, through the hole. When the plunger is retracted, the retaining pin 12 withdraws from the hole.

FIGS. 5C and 5D show the effect on the retaining pins 12 when additional weight is put on the platform 3. As shown in FIG. 5D, weight on the platform 3 causes compression of the rubber washers 32.

The retaining pins 12 are substantially cylindrical in shape and have a notch 25 on one end alongside the central horizontal axis of the cylinders. The notch 25 consists of an annular section removed from the cylinder near one of its substantially circular faces. As best shown in FIGS. 5A to 5D, in the vicinity of the notch 25, a cross-sectional view of the retaining pins along the central horizontal axis of the cylinder would show, from the end of the pin 12 closest the support frame 9, a first region 12*a* with a first diameter, a second region 12*b* with a second diameter and a third region 12*c* with a third diameter. The first and third diameters are substantially equal, and larger than the second diameter.

When the retaining pins 12 are located to hold the platform in place, the notch aligns with the support frame along the length of the pins 12.

In FIG. 5C, as weight is put on the platform 3, the retaining pins 12 engages with the vertical support column plates 23*a,b*, 43*a,b* creating a cylindrical bridge to accommodate the weight of the platform 3. With application of further weight, the support frame 9 moves downward into the notch of the retaining pin 12 as shown in FIG. 5D. The soft rubber washers 32 between the cylindrical pin 12 and the retaining nut 39 are subsequently compressed as the distance between the top of the pin 12 and the bottom of the platform 3 reduces slightly.

The weight of the platform 3 is exerted as a shear force on the retaining pins 12. This, in combination with minimal clearance between the support frame 9 and the vertical support column plates 23*a,b*, 43*a,b*, allows a large weight to be exerted on the platform 3.

The notch 25 on the end retaining pins 12 is also a safety feature ensuring the plungers cannot be disengaged while there is weight on the platform. Additionally, the apparatus may comprise a safety latch over the index plunger 14, such that once the platform is positioned at the desired position and the retaining pins 12 are engaged, the latch slides over the index plunger 14 to guard against disengaging it.

The suspension arrangement 8 is provided such as to allow substantial weight bearing on the platform once the platform is held at a required position, with no need of supporting the end 7 of the platform.

Due to the high weight-bearing characteristics of the retaining pins 12 (high shear strength) and the high tensile strength of then suspension arrangement 8, the limiting factor regarding the weight-bearing capabilities of the lifting apparatus becomes the location in which the lifting apparatus is to be installed and the support surface it is fixed to.

In a first manual operation mode, the gas spring 17*a*, 17*b* and the suspension arrangement 8 are chosen so that the platform 3 becomes "weightless" and can be moved up and down manually with ease. In this context "weightless" refers to a situation where the weight of the platform 3 is sufficiently counteracted by the support provided by the gas springs 17*a,b* through the support frame 9 and the suspension arrangement 8 such that moving the platform 3 up and down can be done smoothly and easily by a single person without exerting themselves strenuously. For example, the only force counteracting movement of the platform may be friction of the rails. In one example, this may mean the platform may be able to be lifted with only 20N of force, meaning the effective weight of the platform is only approximately 2 kg.

In other embodiments, the gas spring 17*a*, 17*b* and the suspension arrangement 8 are chosen so that the force required to move the platform is greater, but the platform moves without user input, unless held in place by the holding mechanism 21.

In a second manual operation mode, the gas springs 17*a*, 17*b* and suspension arrangement are chosen so that a force of approximately 50N is exerted upwardly on the platform 3. In this example a force of 50 N will be required to pull the platform 3 down to the engaged position. However, the platform 3 will return to a fully lifted position on its own accord once the system is disengaged.

In a third manual mode of operation the gas springs 17*a*, 17*b* and suspension arrangement are chosen so that a force of approximately 50N is exerted downward on the platform 3. When disengaged, the platform 3 will in this mode require 50 N of upwards force from a user to move back to the upper position.

It is possible to operate the lifting apparatus 1 from either the index plunger 14, or from the opposing side by manually manipulating the forked plate 27, and hence move the retaining pins 12 away from the support frame to disengage the retaining pins 12 and raise or lower the platform 3.

FIG. 9 shows the lifting apparatus 1 viewed from the back of the support frame 9. In particular, the arrangement of the various vertical members such as the resiliently deformable member 17, the linking members 10*a,b*, and the slide rails 13*a,b* is shown clearly in this Figure. In addition, the position of the retaining pins 12*a,b* indicates the position of the vertical support column plates 23*a,b* and 43*a,b*, given the holes in which the retaining pins push into are in the vertical column support plates 23*a,b*, 43*a,b*.

Movement of the platform 3 beyond the desired horizontal position is prevented by the design of the bracket 2. This allows user to push the platform upwards without creating slack in the webbing 10 if the upwards motion cannot be urged by the resiliently deformable member alone due to increase in weight from an adjusted set point. This provides a solid feel to the platform 3 in all axis movements.

This may also allow a vehicle to be used in transit with a bed in any position without the bed and/or the lifting apparatus making any noise, i.e., there is no vertical movement at either ends of the platform 3.

The chamfered face 35 of bracket 2 allows movement of the bracket 2 in the direction of 'Rotation A' and hence the weight of the platform 3 from the end 7 of the platform 3 is exerted through the suspension mechanism 8 instead of creating a force on the runners due to the cantilever effect.

The platform 3 in this situation can be rotated in the 'Rotation A' direction—as top of chamfer line is above the centre of bolt 6. 'Rotation B' movement is prevented as the vertical face of bracket 2 is seated against the support frame 9. An upwards manual force can thus be applied on the platform 3 if required.

In addition to the features of the lifting apparatus described thus far, there may optionally be an electrically operated linear actuator 26, shown in FIG. 2 (as well as FIG. 1) which may be added to allow the user to instead use the lifting apparatus 1 in an automated electrically operated mode. The lifting apparatus is provided such that this electrically operated linear actuator is not required for the apparatus to function, and instead is added as an optional feature only.

The linear actuator 26 is provided such that it can be removed from the apparatus 1 to revert to the manual operation mode. The removal of the linear actuator is done via the removal of one split pin and is thus quick and simple to do, for example in case the system runs out of power or there is an issue with the linear actuator 26.

In electrical operation mode, a high amperage sensor (not shown) may be provided to sense overload to prevent risk of damage to the actuator.

In normal operation with the linear actuator, the holding mechanism is first disengaged, with the linear actuator 26 then used to move the platform 3 up or down. As the desired position is neared by the platform 3, the index plunger 14 is released and when the holding mechanism is thus engaged, the user can release a switch to stop the linear actuator 26.

In case of the stopping operation described above fails to occur, a sensor senses that the linear actuator 26 cannot move, by sensing an increase in drawn current. The device then interrupts the current to prevent damage to the linear actuator 26.

The gas springs may be replaced by the linear actuators if only the electric mode is required.

Figure 10:
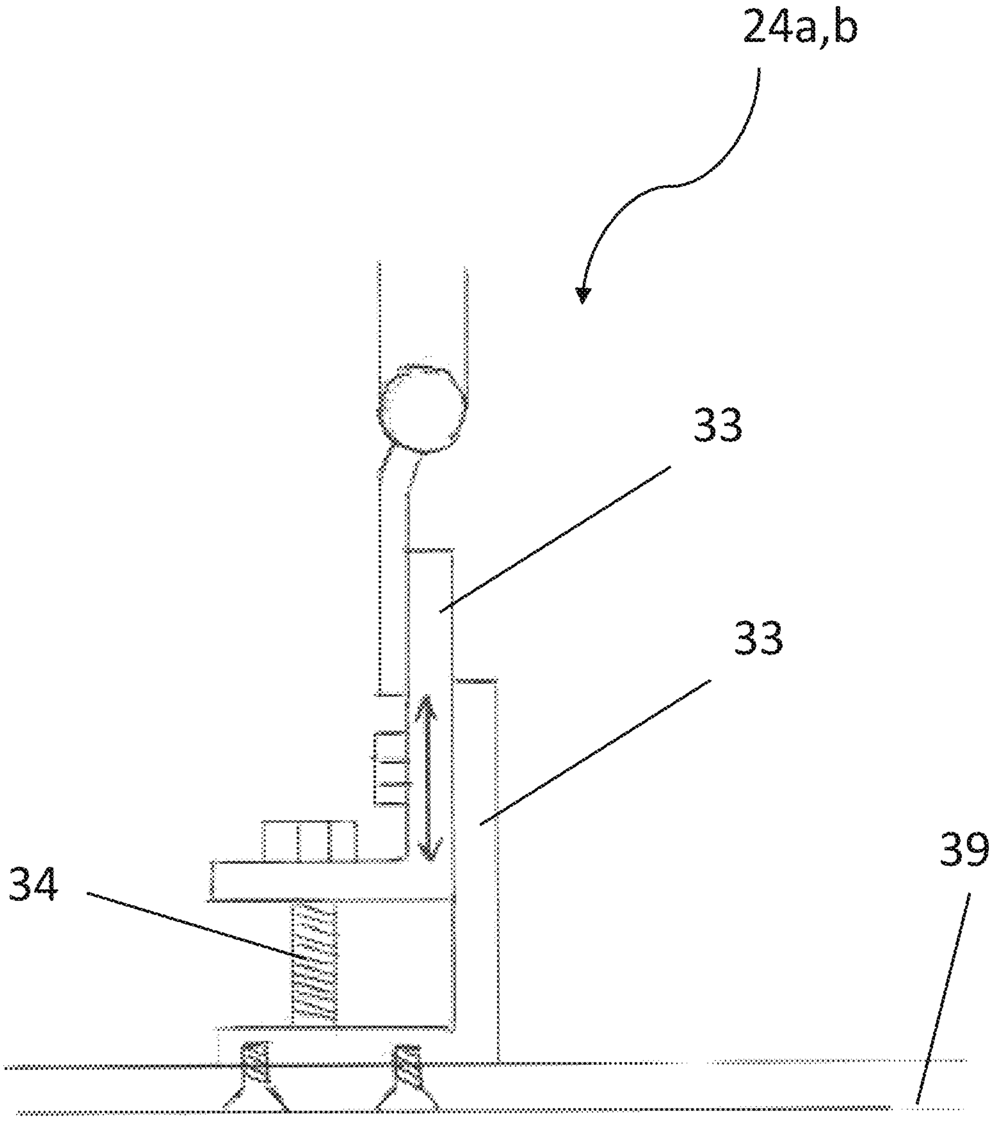
FIG. 10 illustrates a floor-level bracket assembly.

FIG. 10 shows the arrangement of the slider 24*a,b*. The webbing strap tautness may be adjustable by the sliders 24*a,b*. This is provided for by two mating 90° brackets 33 with lock off bolts on vertical plates and main tensioner bolt 34 separating the horizontal forces. When the bolt 34 is tightened the faces come together and more tension is generated.

In the example discussed above, the platform 3 is held in place by retaining pins 12 extending through openings in the support column plates 23 and support frame 9. This is by way of example only. An alternatively means for holding the platform in place will now be discussed with reference to FIGS. 11A to 11C, 12A and 12B, and 13 to 15. Unless explicitly stated otherwise, the embodiment discussed with reference to FIGS. 11A-C, 12A-B and 13 to 15 is the same as discussed above.

In the example discussed with reference to FIGS. 11A-C, 12A-B and 13 to 15, one or more slide blocks 42 secured to the support frame 9 engages with notches 41*a,b* formed on the support column plates 23*a,b* to hold the platform 3 in place.

FIGS. 11A-C and 12A-B show a slide block 42 in more detail. The slide block 42 has a cuboid body. The body has a top face 50 and a bottom face parallel to and spaced from the top face 50. A pair of parallel side faces 51 and 51' extend along the longitudinal length of the body 42, between the top face 50 and bottom face, spaced by the width of the body. A pair of parallel end faces 52, 53 extend across the width of the body, perpendicular to the side faces, spaced by the length of the body.

Ona first portion of face 51' of the slide block 42, a pair of vertically extending projections 44*a*, 44*b* are formed. The projections 44*a*, 44*b* are spaced from each other along the length of the side face, defining a notch 47 between them. The projections 44*a*, 44*b* and notch 47 are formed towards one end 52 of the block 42. In the example shown, a first projection 44*a* is flush with the end 52 of the body 42, but this is by way of example only and the first projection 44*a* offset from the end 52.

The slide block 42 additionally comprises screw holes 46 on the top face 50, spaced along the length of the body 42. Along the length of the body 42, the screw holes 46 are generally towards the end 53 of the block 42 away from the projections 44*a*, 44*b* and notch, between the end 53 and the second projection 44*b*. Across the width of the slide block 42, the screw holes 46 are positioned between the side face 51 of the block that does not have projections, and the portion 51' of the opposite side face away from the projections 44*a,b*.

The support frame 9 includes apertures 48 through which the slide block 42 is received. The aperture 48 is sized to receive the full width of the slide block including the projections 44*a*, 44*b*, such that the slide block 42 can move along its length through the aperture 48.

Figure 14:
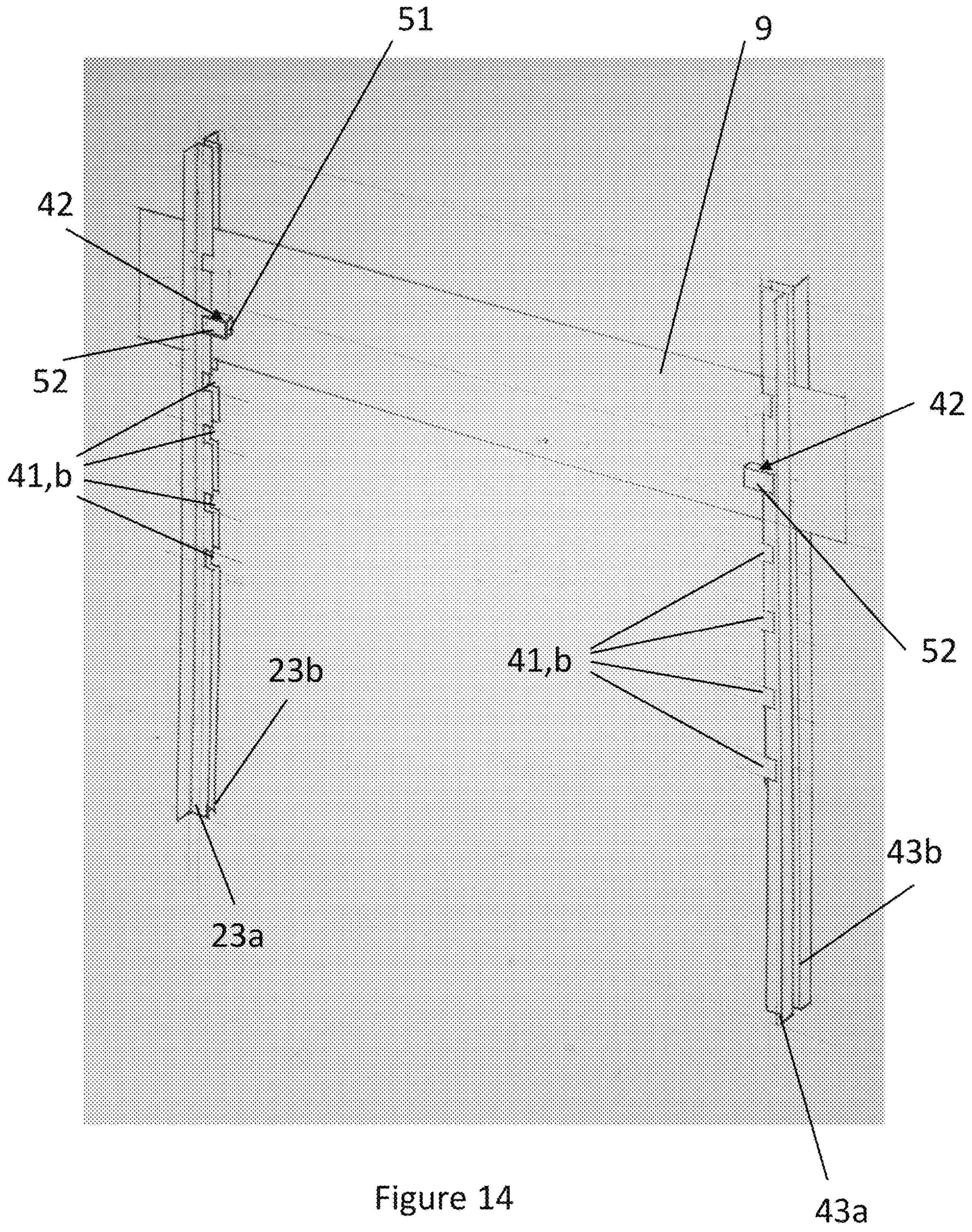
FIG. 14 illustrates a perspective view of the vertical support column plates and the support frame, with the slide block in the engaged position.
Figure 15:
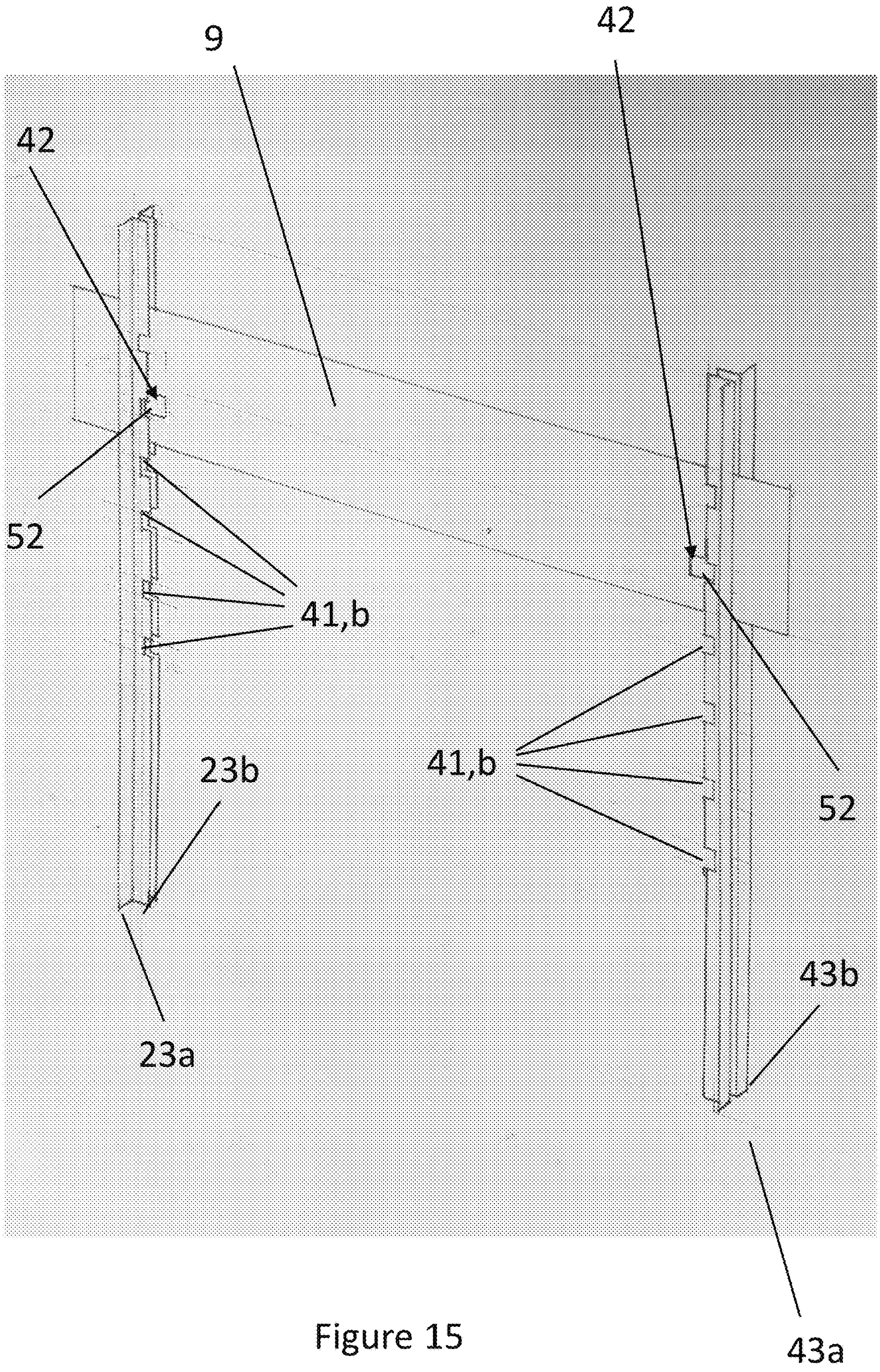
FIG. 15 illustrates a perspective view of the vertical support column plates and the support frame, with the slide block in the disengaged position.

As shown in FIGS. 14 and 15, the slide blocks 42 are provided in the apertures 48 with the first end 52 of each slide block facing towards the platform 3. The support column plates 23*a,b* have vertical notches 41*a,b* in the vertical edges facing each other. In the embodiment shown, the slide blocks 42 and apertures 48 are arranged so that the apertures are between support column plates 23*a,b* and the projections 44*a*, 44*b* and notches on the side of the slide block 42 face the notched edges of the support column plates 23*a,b* (and the sides 51 of the slide blocks 42 face each other).

Figure 12A:
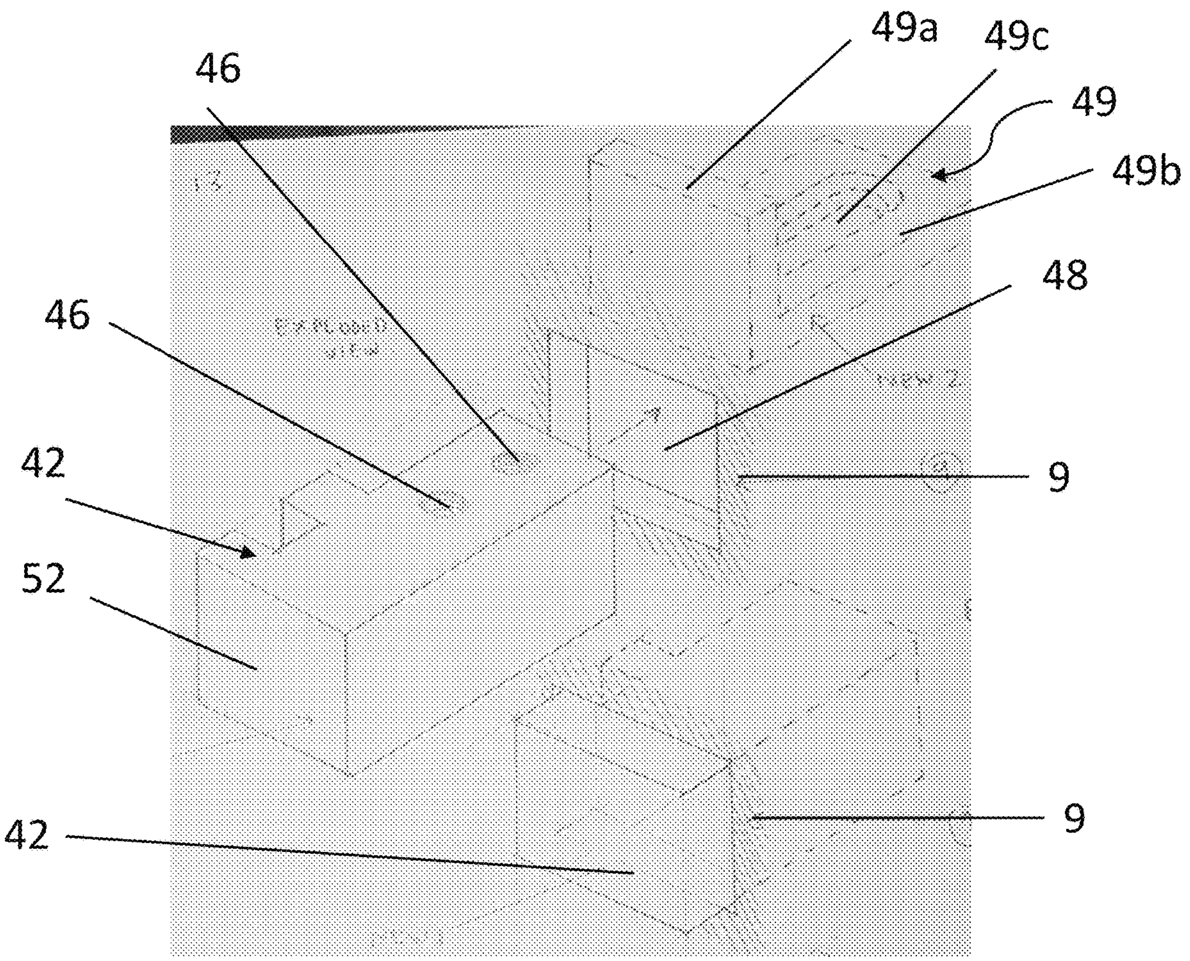
FIG. 12A illustrates a perspective view of the slide block of FIG. 11A in relation with the support frame, with the slide block in the engaged position.
Figure 12B:
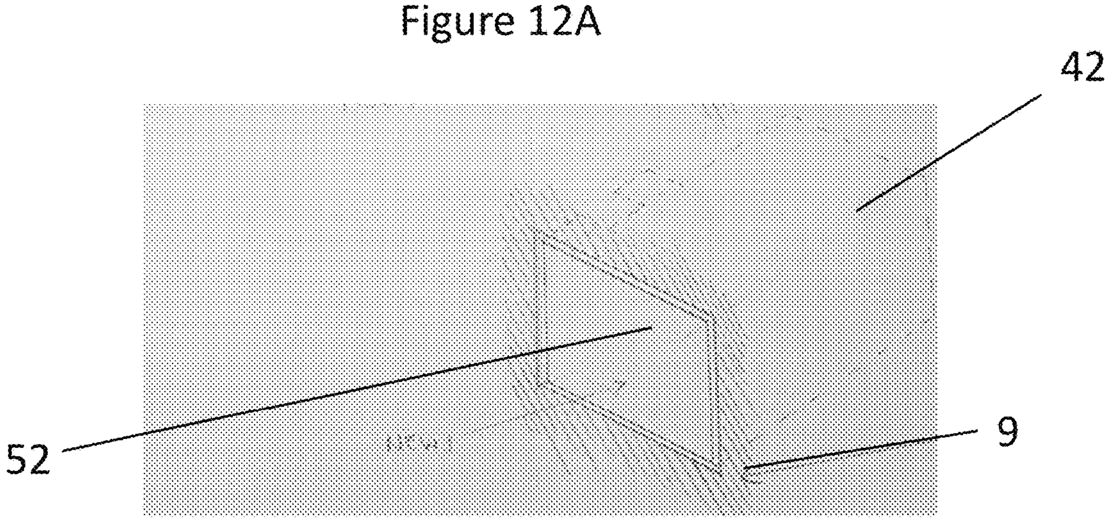
FIG. 12B illustrates a perspective view of the slide block of FIG. 11A in relation with the support frame, with the slide block in the disengaged position.
Figure 13:
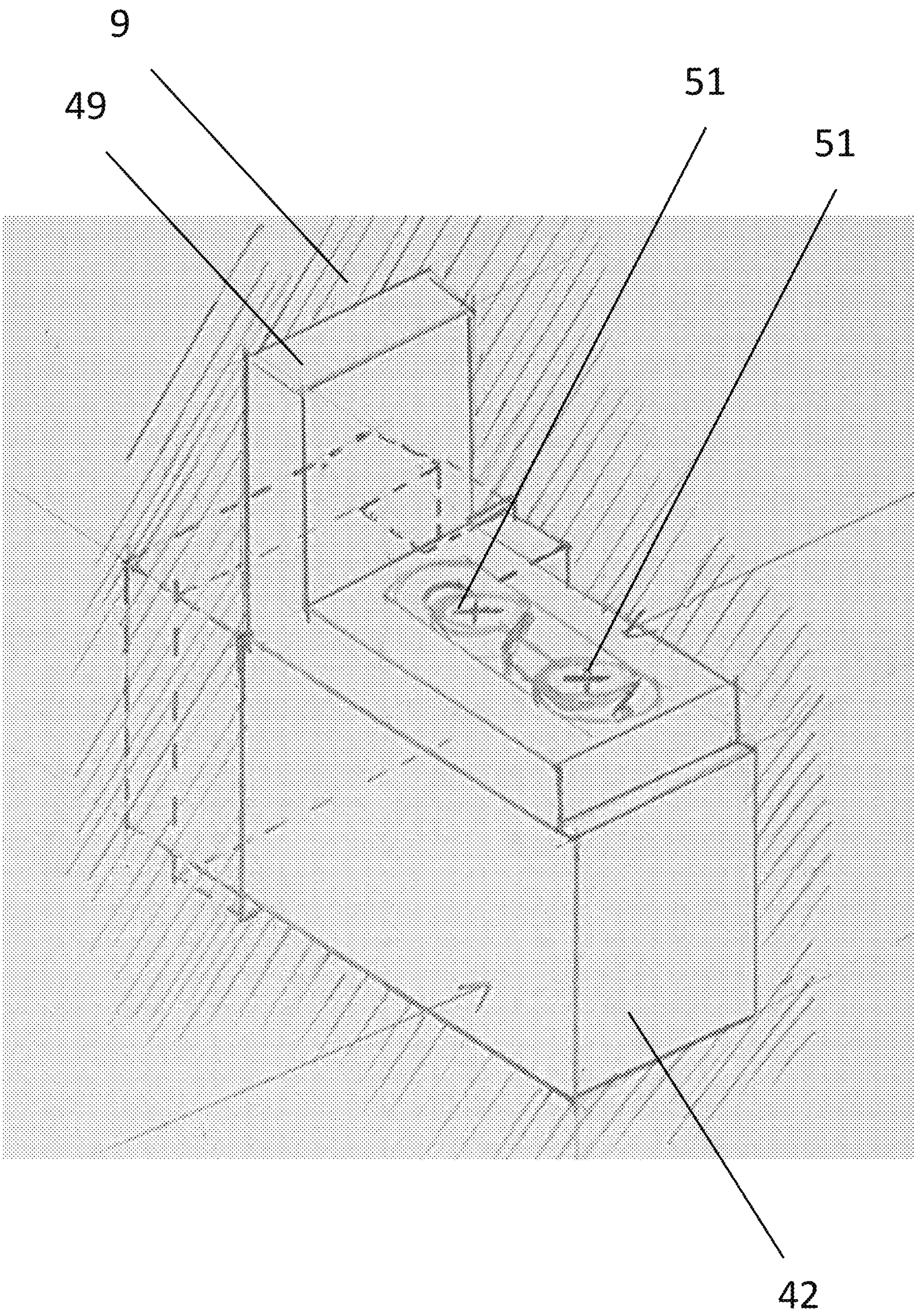
FIG. 13 illustrates a perspective view of the slide block of FIG. 11A in relation with the support frame and the bracket, with bracket screwed onto the slide block.

As shown in FIGS. 12A-B and 13, the slide block 42 is secured to the support frame 9 by a right-angled bracket 49. In the example shown, the bracket 49 has a vertical section 49*a* secured to the support frame 9 on the side of the support frame 9 opposite the platform 3. The bracket 49 further includes a horizontal section 49*b* extending from the bottom of the vertical section, away from the support frame 9 towards the end 53 of the slide block 42 opposite the projections 44*a*, 44*b*. The horizontal section 49 extends along the top surface 46 of the slide block 42 and is offset away from the projections 44*a*, 44*b* across the width of the slide block 42.

The horizontal section 49*b* of the bracket has an elongated opening 49*c* extending parallel to the length of the body and aligned with the screw holes 46 in the body 42. The opening is in the form of a countersunk groove to receive screws attaching the bracket 49 to the slide block 42 via the screw holes 46.

The groove 49*c* is wide enough to allow screws to pass through into the screw holes in the slide block, but large enough to retain the screw head. This allows the slide block to slide along its length, whilst holding the block relative to the support frame 9.

The support frame 9 and platform 3 is held in place by the projections 44*a*, 44*b* in the slide blocks 42 engaging with the notches in the support column plates 23*a, b*.

Figure 11A:
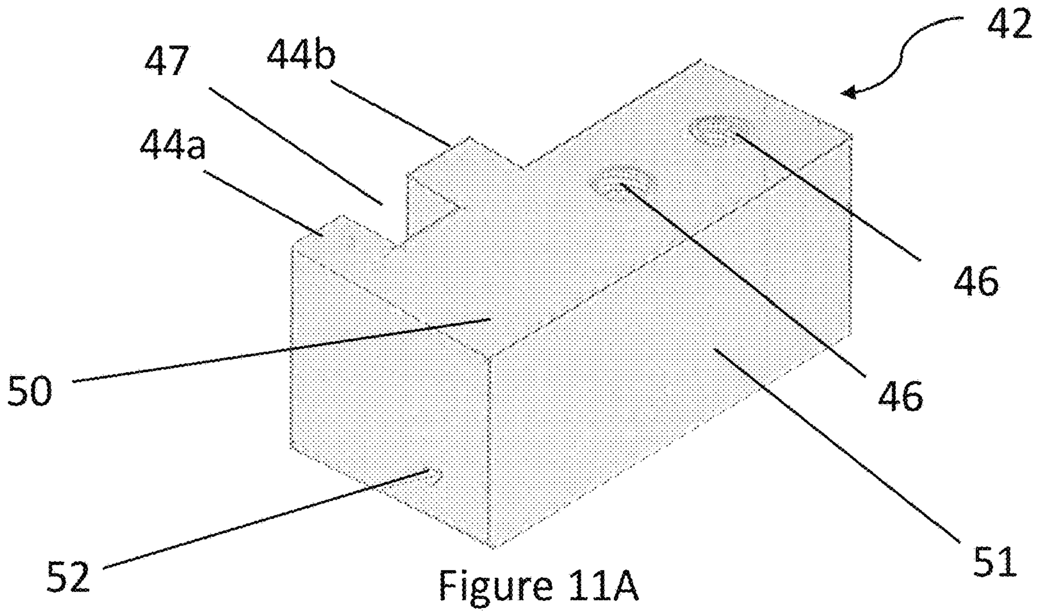
FIG. 11A illustrates a perspective view of a sliding block showing an alternative means for holding the platform.
Figure 11B:
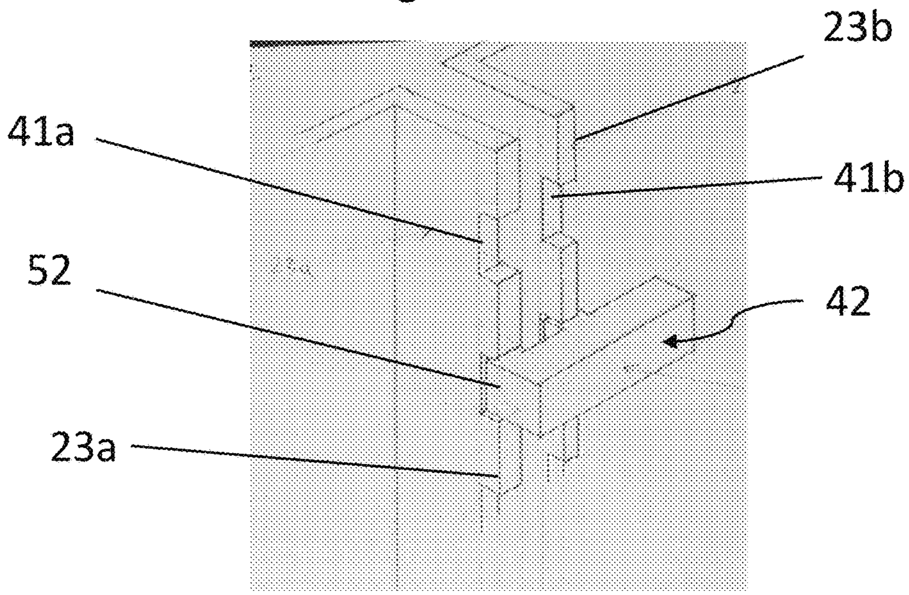
FIG. 11B illustrates a perspective view of the two support column plates and the slide block of FIG. 11A in an engaged position.

FIGS. 11B, 12A (bottom right portion) and 14 show the slide block(s) 42 in an engaged position in which vertical movement of the platform is prevented. In this position, the projections 44*a*, 44*b* on the block 42 complementarily fit within the notches 41*a*, 41*b* on the support column plates 23*a,b*. the engagement of the projections 44*a*, 44*b* of the slide block 42 with the notches on the vertical support plates 23*a*, 23*b* prevents vertical movement of the platform 3.

Figure 11C:
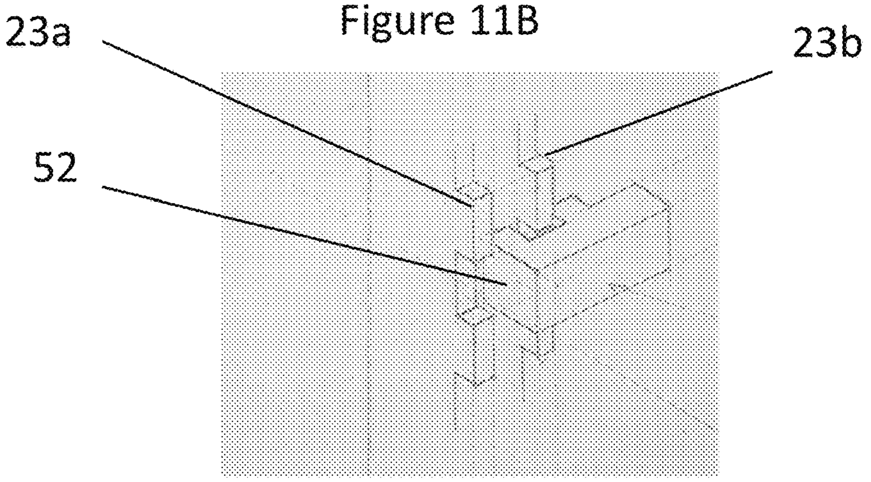
FIG. 11C illustrates a perspective view of the support column plates and the slide block of FIG. 11A in a disengaged position.

FIGS. 11C, 12B and 15 show the slide block 42 in a disengaged position. The slide block 42 in this position is slid along its longitudinal length, through the aperture 48 in the support frame 9, such that one of the projections 44*a* of the slide block 42 fits in the gap between the two support column plates 23*a,b* (i.e. in the aperture 48 in the support frame 9) and the other projection 44*b* is positioned such that the second vertical column plate 23*b* is positioned between the two projections 44*a*, 44*b*, In this disengaged position, the slide block 42 is disposed such that it can move vertically, and such motion is not hindered by the support column plates 23*a,b*. This causes the support frame 9 and platform 3 to move vertically.

The notches in the support column plates 23*a,b* extend over the aperture 48 in the support frame 9 in a horizontal direction, so that the notches in the support column plates 23*a,b* align with the projections 44*a*, 44*b* and notches on the side of the slide block 42. Therefore, the slide block 42 is not prevented from sliding along its length through the aperture when the aperture 48 is vertically aligned with the notch in the support column plates 23*a,b*. However, if the aperture 48 is vertically offset from the notch in the support column plates 23*a,b*, the slide block is prevented from sliding along its length. Therefore, the vertical notches form the locator points in this example.

The length of the elongated opening 49*c* in the bracket 49 is sized to ensure that the slide block can slide between these two positions when the screws are stopped at opposite ends of the opening 49*c*.

In the engaged position, as shown in the bottom part of FIG. 12A and FIG. 14, the support frame 9 is supported by the slide block 42 as the weight of the support frame 9 falls on the portion of the body 42 between the projections 44*a*, 44*b*. In this configuration, the slide block 42 provides a bridge similar to that provided to the retaining pins as described above.

The movement of the slide block 42 is actuated in a similar fashion to the movement of the retaining pin discussed above, by actuation of an index plunger linked to the slide block by, for example, a forked plate. There may be provided a retention spring arranged to pull the slide block along the forked plate assembly when the system is in the unengaged position.

The arrangement of the slide block 42 discussed above is given by way of example only. Various different spacings and shapes of notches may be used.

In the example shown, the slide blocks 42 are provided between the support column plates 23*a,b*, and the support column plates 23*a,b* have notches on the inwards facing edges. However, one or both of the slide blocks 42 may be positioned on the outer edge of the corresponding support column plates 23*a,b*, with the notches formed in the corresponding edge.

Similarly, in the above example, the bracket 49 and platform 3 are arranged on opposite sides of the support frame 9. However, this is by of example only, and the bracket 49 and platform 3 may be on the same side of the support frame 9.

Figure 16:
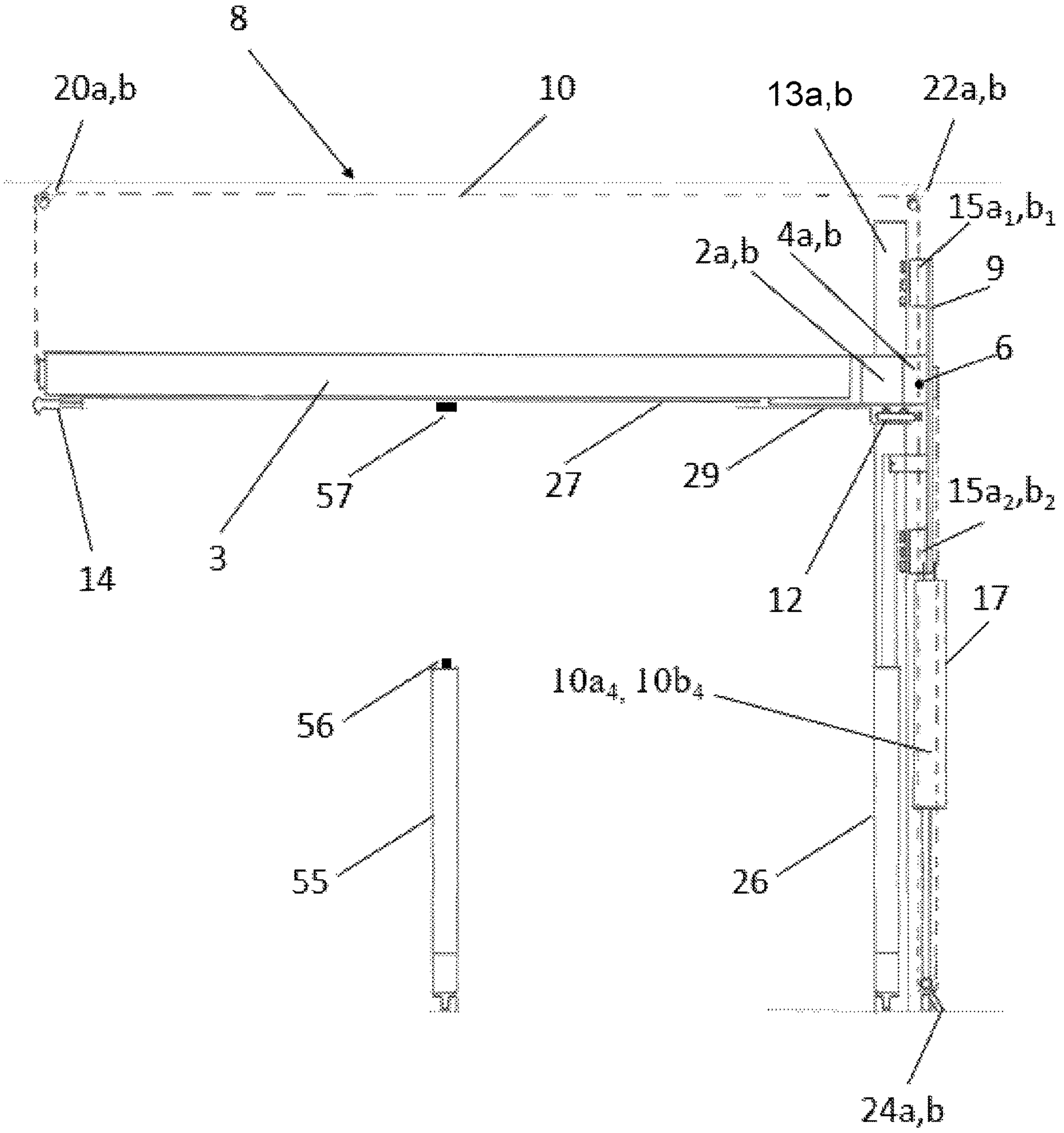
FIG. 16 illustrates an embodiment of the lifting apparatus comprising vertical posts and retainer latches.

In a further alternative embodiment, shown in FIG. 16, the platform 3 may rest on two vertical posts 55 secured to the base or platform the lifting apparatus is fixed to. In this example the resiliently deformable member, for example comprising gas springs, may be adjusted such that the platform falls slowly under its own weight in a control way, requiring only small amounts of pressure to be raised. In this example, holding means may be provided to hold the platform in the raised position. Any suitable holding means may be used. Alternative, a strap or other connection may be provided.

In this embodiment, any suitable position of the two vertical posts 55 may be used. The posts 55 may be telescopic or include removable section to change the length, such that the height of the platform may be varied. In this example, the post may form the means to hold the platform 3 at a desired height.

In the example discussed above, the resiliently deformable member is arranged so that the platform moves down to the posts, and the posts prevent further downward movement. Alternatively, the gas spring or other resiliently deformable member may be arranged so that instead of the platform moving slowly down under its own weight, the platform moves slowly upwards under its own weight. In this example, the vertical posts 55 may additionally comprise a first portion 56 of a retainer latch, the second portion 57 of which is attached to the bottom of the platform 3. This retainer latch is provided such that when the platform 3 rests on the vertical posts 55, the retainer latch keeps the platform 3 secured to the vertical posts 55 and prevent the platform 3 from moving vertically upwards, even when the force from the means to urge the platform 3 exceeds the weight of the platform 3.

Figure 17:
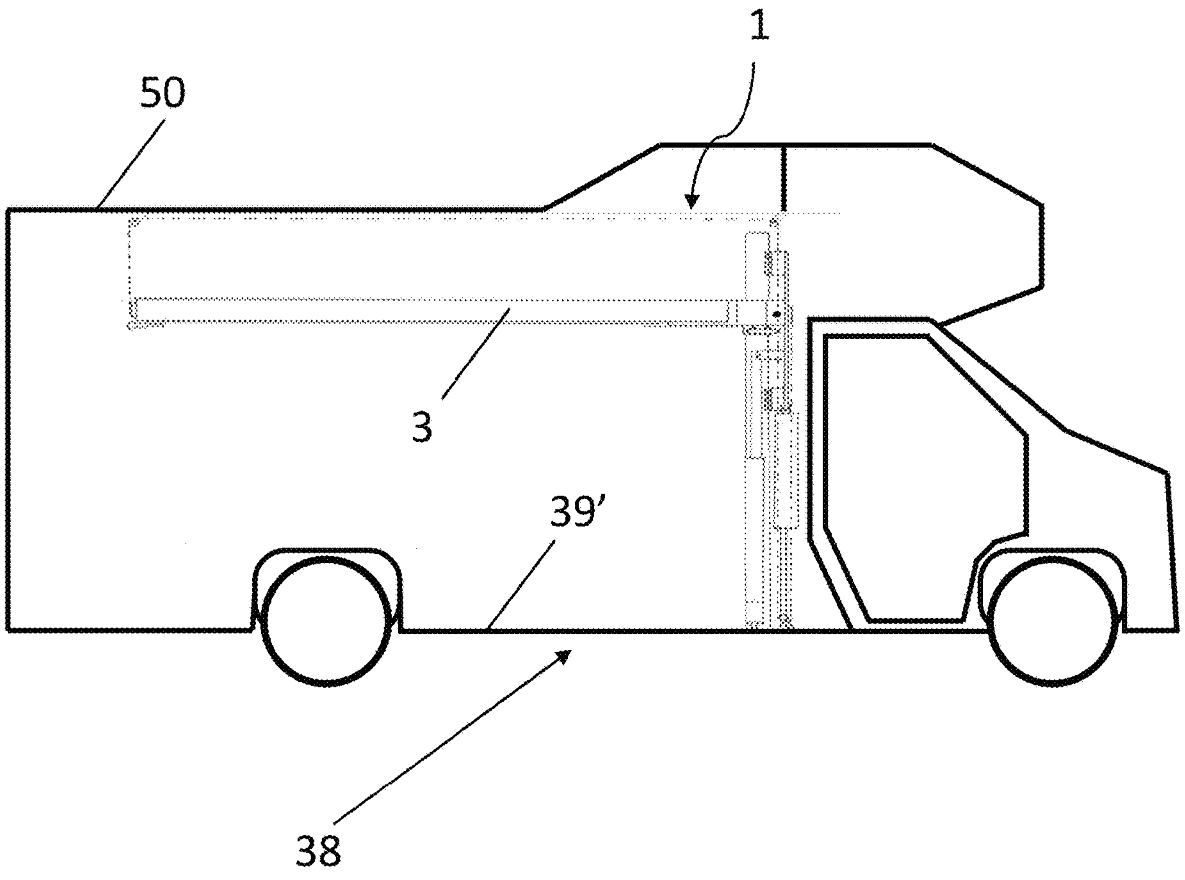
FIG. 17 illustrates an embodiment of the lifting apparatus in a campervan.

FIG. 17 shows a lifting apparatus 1 as described above mounted in a campervan 38. The brackets fixed to the floor as described above are in this embodiment fixed to the floor 39' of the campervan. The sliders 20*a,b*, 22*a,b* for the suspension system are fixed to the roof 50 of the campervan. The lifting apparatus 3 can be used to provide a bed that can be moved out of the way to provide more living space when needed.

In the examples discussed above, the brackets that secure the sliders 24*a,b* at the bottom of the lifting apparatus are secured to the floor. However, this may not be the case, and the brackets may be secured at any suitable position below the support frame 9, at or below a desired lowest position for the platform 3.

The materials used for the construction of the various members of the lifting apparatus 1 may be chosen to have the strength necessary for the desired loads, but also be lightweight.

In some embodiments, the brackets, bearing runners and the platform 3 may be manufactured from aluminium, while the cylindrical retaining pins 12 and the support columns 23*a,b* and 43*a,b* may be manufactured from steel or other hard material to avoid indentation.

The structure given above is by way of example only. Various modifications may be contemplated.

In the example using retaining pins, the holes 16 in the vertical column support plates 23*a,b* may be of a different size to the holes in the support frame 9. The holes in the vertical column support plates 23*a,b* may be of a substantially equal size to the holes in the support frame 9.

In the attached figures, the support frame 9 is shown as rectangular, however, it may be of any shape. Furthermore, whilst in the illustrated embodiment, the support frame 9 is a single part, it may be made of two or more separate elements.

Likewise, the platform 3, although shown as rectangular, may be of any shape and may be provided on any axis that allows the platform 3 to rotate in the correct direction with respect to the support frame 9.

Any type of hinge may be used to couple the platform 3 to the support frame 9. In the embodiments being discussed, the hinge is free to rotate about a single axis (the axis parallel to the ends of the platform 3). In other embodiments, bearings with greater degrees of freedom may be used. Bearings may be used when the support frame 9 is made of a single piece or multiple pieces.

Any number of hinges 6*a,b* or bearings may be provided to secure the platform 3 the support frame 9. Any suitable type of hinge or bearing that allows rotation at least around the axis parallel to the ends of the platform 3 may be used.

In another embodiment, the support frame 9 is omitted and instead two bearings are integrated into each side of the platform, close to the bearing runners. A small vertical frame interlinks the bearings runners 15$a_1$ and 15$a_2$, and similarly 15$b_1$ and 15$b_2$. These two frames can slide up and down independently. Both these frames have an integrated stud that fits into the bearing of each side of the platform 3. The bearings on the platform 3 locate onto these studs at each end with minimal play thus creating enough rigidity to prevent tilting of the platform 3 (i.e., the independent sliding frames will be at equal vertical elevation in movement) and the platform 3 is allowed to pivot around the bearings.

In some examples, the lifting apparatus 1 may be provided such that it uses no suspension arrangement 8. In this case, the support frame 9 and platform 3 are rigidly attached to each other and fortified at the 90° join, where the platform 3 joins the support frame 9 to allow no freedom of movement. The slide runners in this case are designed to take the full cantilever load of the platform.

The linking means 10*a,b* may be of any suitable material and may be any type of linking of means, such as rope, chain, cord, rubber belt, webbing, or any other type of linking means. There may be any number of linking means. The linking means 10*a,b* may follow any suitable path extending from the second end 7 of the platform 3 to the support frame 9. The linking means 10*a,b* may not be elastic. The tautness of the linking means 10*a,b* may be fixed and not adjustable.

Gas springs are just one example of a resiliently deformable member that can be used to urge the frame 9 upwards. The lifting apparatus 1 may be provided with any suitable resiliently deformable member 17, with the spring characteristics suitably chosen to help reduce the effort required to move the platform 3 up and down and the spring characteristics optionally being adjustable. For example, coil springs, hydraulic cylinders or the like may be used. Where an electrical actuator is provided, this may be combined with the resiliently deformable member.

There may be provided any number of resiliently deformable members of any type.

The lifting apparatus may be provided such that the platform 3 may be pulled from above instead of being pushed by a member from below. In this example the resiliently deformable member may be such that it is attached to the ceiling or at points above the platform or arranged such that it pulls the platform from above.

There may be provided any number of index plungers 14 or other means for actuating the movement of the retaining pins or slide block. Furthermore, there may be any suitable number of retaining pins 12 or slide blocks. There may be provided any suitable mechanisms which create a push force to move the retaining pins or slide blocks. One such example may be a simple lever at the end 7 of the platform 3.

The use of the retaining pins or slide block is by way of example only. The person skilled in the art will appreciate that any other means of holding the platform in place in an engaged position and allowing sliding in a disengaged position may be used.

The connecting members 27 and 29 may be fixed to the platform 3 in any suitable method. There may be additional connecting members and plates.

The vertical support column plates 23*a,b*, 43*a,b* may have any suitable number of locator points.

In the embodiments discussed above, the platform is held at a vertical position by the retaining pins 13 or slide block 42 or other suitable holding means.

What is claimed is:

1. A lifting apparatus comprising:

a platform extending substantially horizontally between a first end, and a second end;

a support frame at the first end of the platform;

one or more hinge or bearing arrangements coupling the platform to the support frame, the one or more hinge or bearing arrangements configured to rotate about an axis parallel to the first end of the platform;

one or more slide rails extending vertically;

one or more runners fixed to the support frame, each of the one or more runners arranged to slide along one of the one or more slide rails;

means arranged to urge or move the support frame upwards along the one or more slide rails; and a suspension arrangement arranged to hold the platform from above and comprising a linking means arranged to support the platform, wherein:

the suspension arrangement includes a guide mechanism to guide the linking means above the platform, the guide mechanism comprises one or more guide members securable to a support surface or member relative to which the platform and support frame are configured to move, and the linking means is arranged to move relative to the one or more guide members as the platform and support frame moves up or down.

2. The lifting apparatus of claim 1 wherein the means arranged to urge or move the support frame upwards is arranged so that the upwards force on the support frame is substantially equal to or greater than the weight of the platform, or wherein the means arranged to urge or move the support frame is arranged such that the force from the means arranged to urge or move the support frame is less than the weight of the platform, allowing it to slide downwards along the one or more slide rails with a dampened motion.

3. The lifting apparatus of claim 1 wherein the linking means is fixed to the platform by wrap-around plates with high tensile bolts.

4. The lifting apparatus of claim 1 wherein the support frame comprises a substantially rectangular member extending substantially perpendicular with respect to the platform.

5. The lifting apparatus of claim 1 wherein the one or more guide members of the guide mechanism comprises one or more cylindrical rollers suspended from a fixed anchor, the rollers arranged to rotate around an axis perpendicular to the linking means, or wherein the one or more guide members of the guide mechanism comprises low friction members comprising seatbelt sliders, and/or cables and/or pulleys.

6. The lifting apparatus of claim 1, wherein the suspension arrangement is arranged to exert a downwards force on the support frame and an upwards force on the platform.

7. The lifting apparatus of claim 6 wherein the suspension arrangement and the means of urging or moving the support frame upwards are chosen such that the upwards force from the means of urging or moving the support frame upwards is substantially equal to the weight of the platform such that the platform is substantially weightless.

8. The lifting apparatus of claim 1 wherein the lifting apparatus further comprises a holding means, wherein the holding means is actuable between an engaged position where it holds the platform in place along the vertical extent of the one or more slide rails, and an unengaged position in which the platform is free to slide with respect to the one or more slide rails.

9. The lifting apparatus of claim 8 wherein the holding means comprises one or more vertical column plates;

one or more first holes extending through the support frame;

one or more second holes extending through each vertical column plate; and a retaining member that extends through the one or more first and second holes, when a first hole is vertically aligned with a second hole, allowing the holding means to move in the engaged position.

10. The lifting apparatus of claim 8 wherein the holding means comprises one or more vertical column plates with notches on a vertical edge thereof, wherein the notches on the vertical column plates are disposed such as to receive complementary projections on a slide block.

11. The lifting apparatus of claim 1 wherein one end of the platform comprises retainer latches latching into the support frame.

12. The lifting apparatus of claim 9 comprising two vertical support plates on either side of the support frame such that the support frame is in-between the two vertical support plates.

13. The apparatus of claim 9 wherein the retaining member comprises a retaining pin arranged to extend through the one or more first and second holes in the engaged position.

14. The lifting apparatus of claim 13, wherein movement of the retaining member is provided by a connecting member extending from the first end of the platform to the second end of the platform.

15. The lifting apparatus of claim 14, wherein the holding means comprises an index plunger operable between two positions, wherein the index plunger is arranged such that actuation of the index plunger causes movement of the retaining pin, wherein a single index plunger causes movement of the retaining pin of each vertical column plate, and wherein optionally the holding means is actuated by rotation of the index plunger, wherein the actuation of the index plunger moves the connecting member.

16. The lifting apparatus of claim 15 wherein the connection between the index plunger and connecting member is to facilitate the adjustment of the retaining pins relative to the support frame.

17. The lifting apparatus of claim 15, comprising at least two slide rails extending parallel to each other, and spaced along the first end of the platform, wherein the connecting member comprises a forked plate assembly configured such that a single actuator at the second end of the platform can move two or more retaining pins.

18. The lifting apparatus of claim 17 comprising two runners vertically spaced on each slide rail.

19. The lifting apparatus of claim 1, wherein the means to urge or move the support frame upwards is a resiliently deformable member or a linear actuator or both.

20. The lifting apparatus of claim 1 wherein the support frame comprises two or more separate elements arranged to slide up and down independently.

* * * * *